US007965768B2

United States Patent
Ito et al.

(10) Patent No.: US 7,965,768 B2
(45) Date of Patent: Jun. 21, 2011

(54) VIDEO SIGNAL ENCODING APPARATUS AND COMPUTER READABLE MEDIUM WITH QUANTIZATION CONTROL

(75) Inventors: Hiroaki Ito, Yokohama (JP); Tomokazu Murakami, Kokubunzi (JP); Isao Karube, Yokohama (JP); Masaru Takahashi, Yokohama (JP); Daisuke Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1602 days.

(21) Appl. No.: 11/214,949

(22) Filed: Aug. 31, 2005

(65) Prior Publication Data
US 2006/0280243 A1     Dec. 14, 2006

(30) Foreign Application Priority Data
Jun. 13, 2005   (JP) .................. 2005-171884

(51) Int. Cl.
  *H04N 7/12*    (2006.01)
  *H04N 11/02*   (2006.01)
  *H04N 11/04*   (2006.01)
(52) U.S. Cl. ............ 375/240.03; 375/240.05; 348/384.1
(58) Field of Classification Search ............ 375/240.03, 375/240.05; 348/384.1
  See application file for complete search history.

(56) References Cited

U.S. PATENT DOCUMENTS

| 5,638,125 A * | 6/1997 | Jeong et al. ............ 375/240.03 |
| 5,719,986 A * | 2/1998 | Kato et al. ............... 386/109 |
| 6,094,455 A * | 7/2000 | Katta ...................... 375/240.05 |
| 2002/0054639 A1* | 5/2002 | Kawashima et al. ..... 375/240.03 |
| 2004/0125876 A1* | 7/2004 | Kodama et al. ......... 375/240.16 |

FOREIGN PATENT DOCUMENTS

| JP | 07-154785 | * | 6/1995 |
| JP | 9-23423 | | 1/1997 |
| JP | 2002-077905 | | 3/2002 |
| JP | 2002-112266 | | 4/2002 |

* cited by examiner

*Primary Examiner* — David Czekaj
*Assistant Examiner* — James Pontius
(74) *Attorney, Agent, or Firm* — Antonelli, Terry, Stout & Kraus, LLP.

(57) ABSTRACT

The present invention provides an image coding apparatus and an image coding program that execute quantization control so that a generating bit is made close to a target bit. The image coding apparatus according to the present invention includes a generated bit measurement unit, a target bit setting unit, a residual bit computing unit for computing a residual value between the generated bit and the target bit, a remaining video buffer capacity measurement unit, and a quantization parameter computing unit for computing a quantization parameter to set the same to the quantization unit. The quantization parameter computing unit computes a quantization parameter for next image data to be encoded on the basis of at least one of the residual value computed and the remaining video buffer capacity measured.

2 Claims, 18 Drawing Sheets

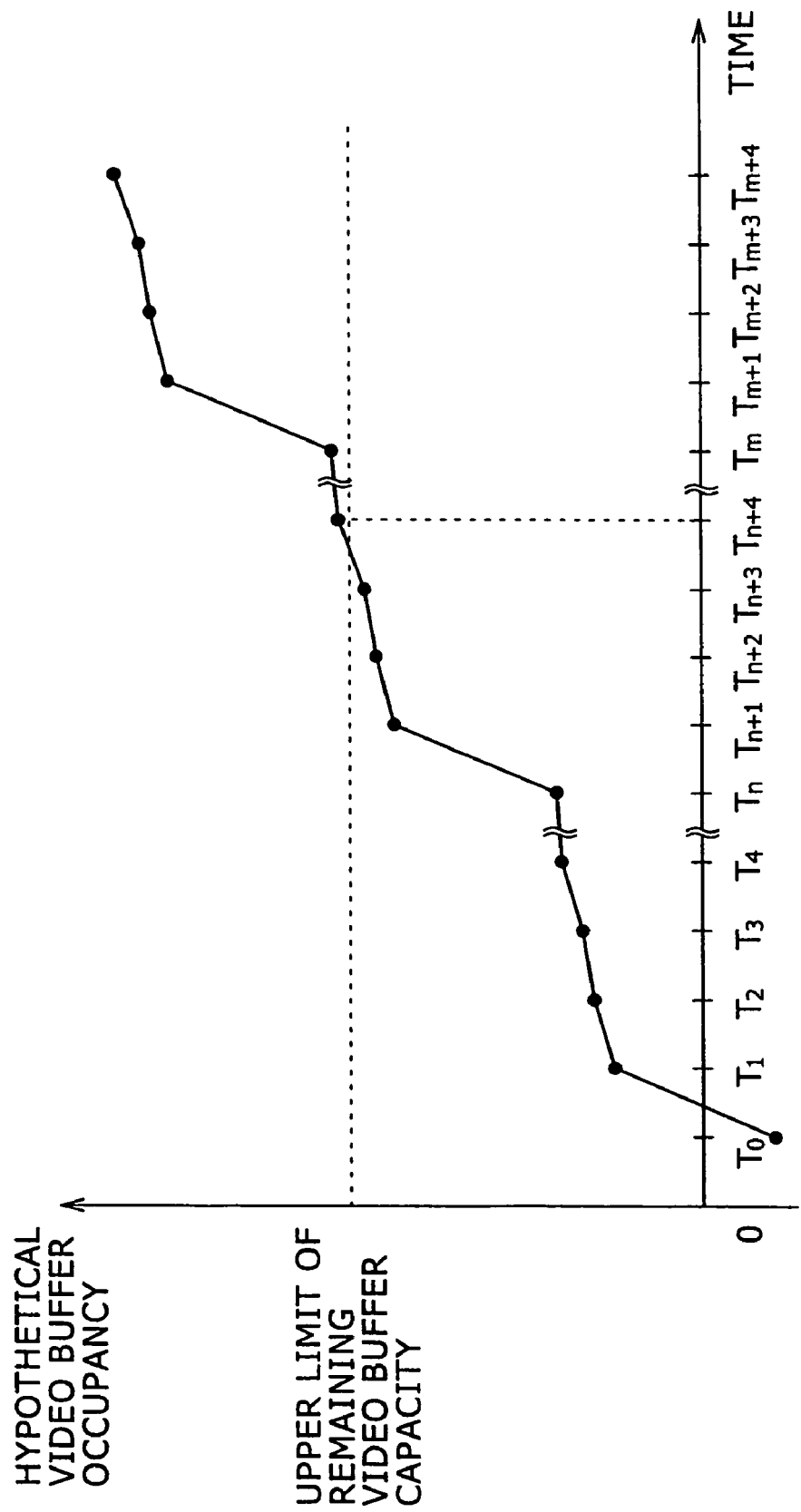

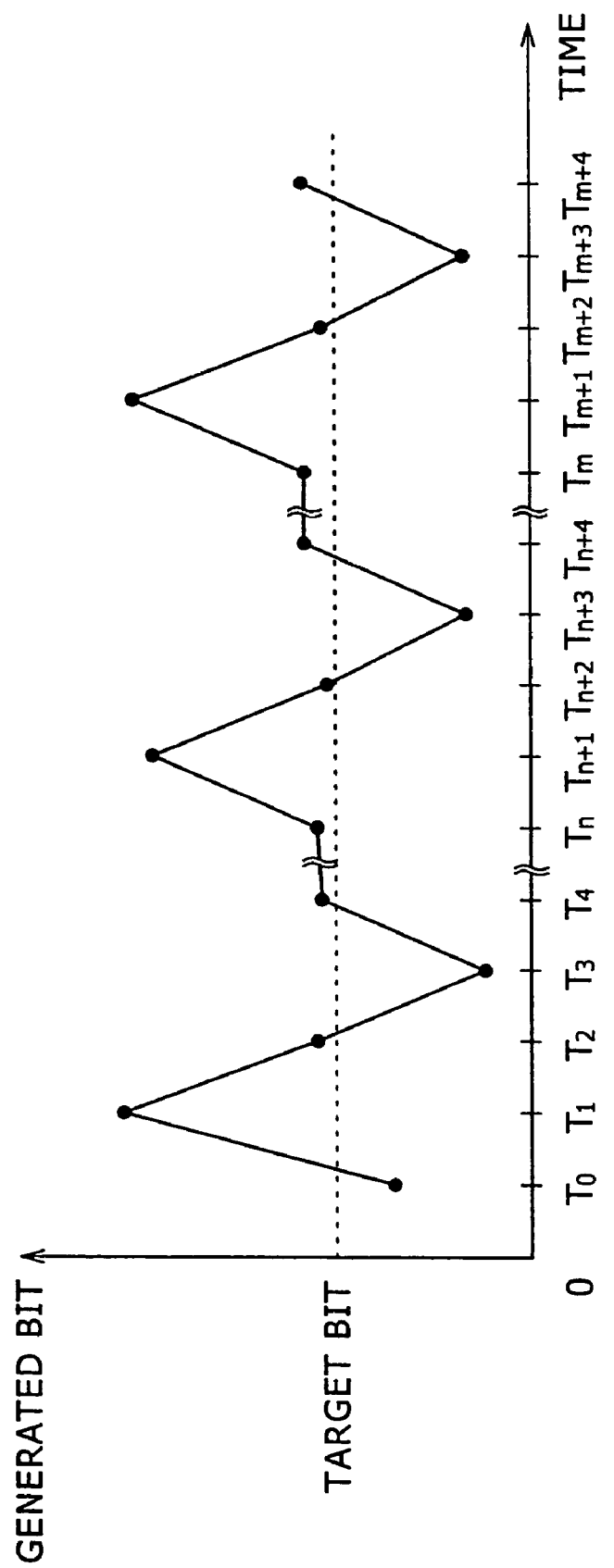

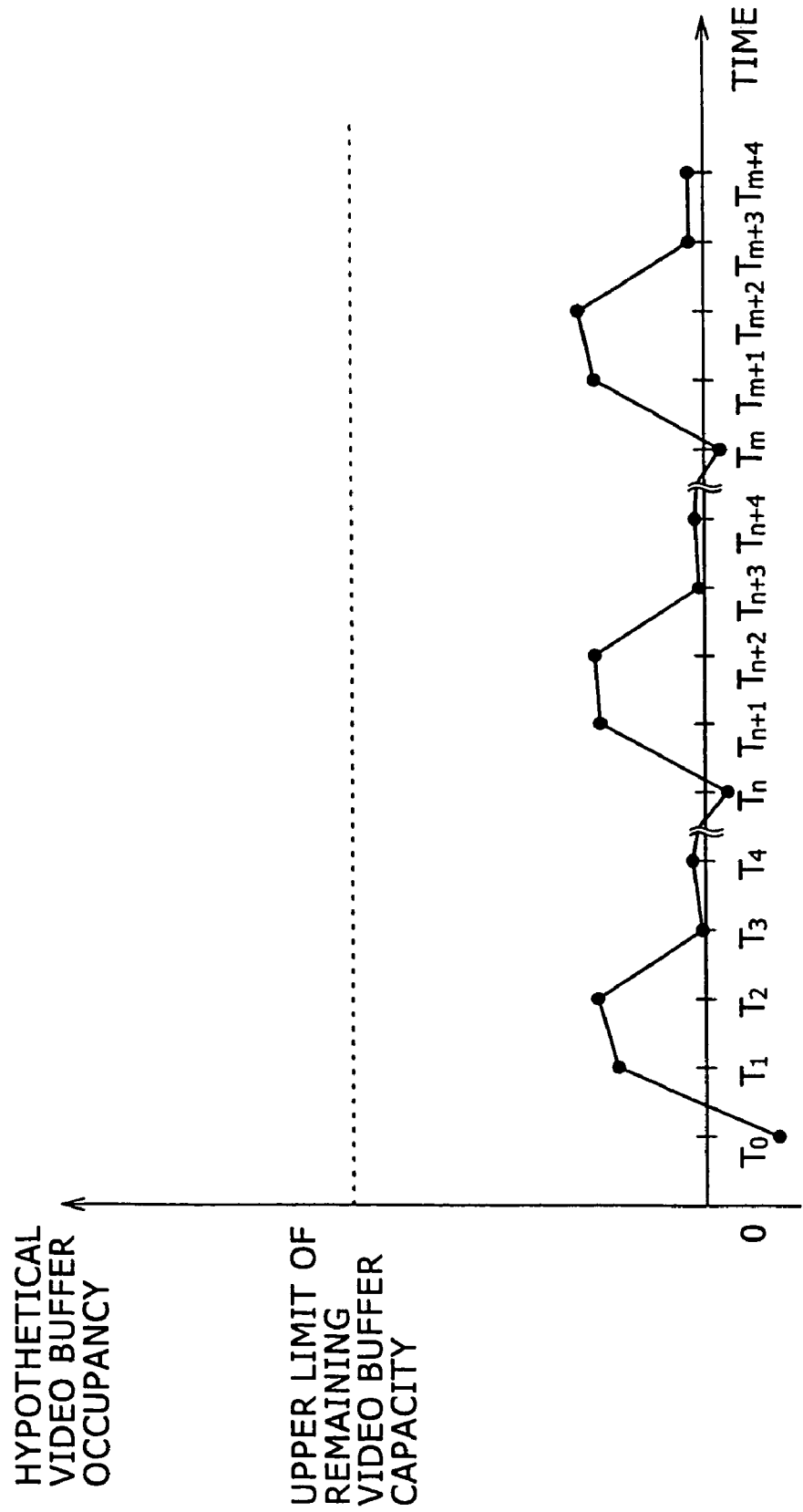

VIDEO SIGNAL ENCODING APPARATUS AND COMPUTER READABLE MEDIUM WITH QUANTIZATION CONTROL

CLAIM OF PRIORITY

The present application claims priority from Japanese application serial no. JP 2005-171884, filed on Jun. 13, 2005, the content of which is hereby incorporated by reference into this application.

BACKGROUND OF THE INVENTION

1. Field of the Invention

The present invention relates to an image coding apparatus that encodes a moving picture with high efficiency, and particularly to an image coding apparatus and an image coding program that execute a quantization control so that a generating bit is made close to a target bit.

2. Description of the Related Art

As a method of encoding data of a moving picture such as a television signal with high efficiency for recording or transmission, an encoding system such as a Moving Picture Experts Group (MPEG) system has been designed. As for the ISO standard of MPEG, coding methods such as the MPEG-1 standard, the MPEG-2 standard, the MPEG-4 standard are employed. In addition, as a system for further improving a compression ratio, the H.264/AVC (Advanced Video Coding) standard and the like have been specified.

In general, a method of encoding and compressing a moving picture employs a so-called hybrid coding method in which compression using a temporal correlation and compression using a spatial correlation are combined.

The compression using a temporal correlation utilizes a similarity (high correlation) between a previous picture and a subsequent picture. Specifically, in the case where there is no change between a previous frame and a current frame, no data is transmitted, or only a motion vector and residual data of portions that are most alike between the previous frame and the current frame are transmitted. By doing so, the data amount can be reduced. This is called the Motion Compensated Prediction.

On the other hand, the compression using a spatial correlation utilizes an approximation of values (high correlation) between adjacent pixels in a picture. Specifically, there is employed a method in which the Discrete Cosine Transform (DCT) is used to perform a frequency transform on a certain area unit in a picture.

A signal which has the image data redundancy removed by the Motion Compensated Prediction and the DCT is quantized so as to compress the data. The quantization is a process in which a DCT coefficient is divided by a quantization step value to be converted into a smaller value and then the quotient is rounded to an integer. With this process, values of high frequency components most of which have small values can be held down to 0, thus largely eliminating a generating bit.

In a conventional quantization control method, for example, a frame unit quantization control section determines quantization characteristics to be used in a current image frame based on the generated information quantity of a previous image frame. A block unit generated information quantity calculating section calculates the generated information quantity per one block from the generated information quantity accumulated up to the current time for the current image frame. A maximum allowable information quantity calculating section calculates maximum allowable information quantity per block every time when one block in the current image frame is encoded. A comparing section compares the generated information quantity per block with the maximum allowable information quantity every time when one block in the current image frame is encoded. Based on the comparison results, a block unit quantization control section determines quantization characteristics of the next block within a predetermined range around quantization characteristics determined at the frame unit quantization control section. Such an apparatus is disclosed in, for example, Japanese Patent Laid-open No. 2002-77905 A (Patent Reference 1).

According to the technology described in Patent Reference 1, a quantization step as a basis for the use of encoding an image frame or blocks constituting an image frame to be processed is determined on the basis of the generated bit that is the amount of data produced in encoding the previous image frame. That is, depending on a residual value between a predetermined target bit and a generated bit, a generating bit is controlled so as to be decreased by increasing a quantization parameter in the case where the generated bit is larger than the target bit. On the contrary, in the case where the generated bit is smaller than the target bit, a generating bit is controlled so as to be increased by decreasing the quantization parameter. Accordingly, a generating bit is controlled so as to be close to the target bit.

SUMMARY OF THE INVENTION

However, there is a problem that the quantization control on the basis of the generated bit may possibly cause a transmitting buffer of an encoder or a receiving buffer of a decoder to be collapsed.

A concrete example will be described with respect to this problem.

FIGS. 15 and 16 are views for explaining an example of an encoder that executes quantization control on the basis of the generated bit, respectively. FIG. 15 shows the generated bit per unit time, and FIG. 16 shows hypothetical video buffer occupancy per unit time.

In FIG. 15, the generated bit largely exceeds the target bit at time=$T_1$ due to drastic changes in the input picture, a scene change, or the like. Therefore, the encoder controls a generating bit so as to be decreased by increasing the quantization parameter at subsequent time=$T_2$. Similarly, the generated bit largely exceeds the target bit at time=$T_{n+1}$, and the encoder accordingly controls a generating bit so as to be decreased by increasing the quantization parameter at time=$T_{n+2}$.

The hypothetical video buffer occupancy is used as an evaluation value indicating a degree of occupancy in a transmitting video buffer of the encoder by coded data. The hypothetical video buffer occupancy is defined as the accumulated value of the value obtained by subtracting the data amount that has been output to a transmission line per unit time from the generated bit per unit time. When the generated bit is larger than the data amount that has been output to the transmission line, the hypothetical video buffer occupancy becomes larger than 0. On the contrary, when the generated bit is smaller than the data amount that has been output to the transmission line, the hypothetical video buffer occupancy becomes smaller than 0.

In FIG. 16, the hypothetical video buffer occupancy is largely increased at time $T_1$ and time $T_{n+1}$ in synchronization with the points where the generated bits largely exceed the target bit. Thereafter, the hypothetical video buffer occupancy is gradually increased.

As described above, although the transmitting video buffer of the encoder has the limited size (the upper limit of the remaining video buffer capacity in FIG. 16), the hypothetical video buffer occupancy is not considered in the quantization control on the basis of the generated bit. In the examples of FIGS. 15 and 16, collapse of the video buffer occurs at time=$T_{n+4}$.

In the invention described in Patent Reference 1, in order to address the problem of the buffer collapse, a generating bit is controlled so as to be decreased by increasing the quantization parameter in the case where the hypothetical video buffer occupancy is larger than 0. Further, a generating bit is controlled so as to be increased by decreasing the quantization parameter in the case where the hypothetical video buffer occupancy is smaller than 0. By doing so, a generating bit is controlled so as to be close to the target bit. However, the method of the quantization control on the basis of the hypothetical video buffer occupancy causes a problem that a convergence time required to reach the target bit becomes long and a range of the generating bit is wide, and thus deterioration in the subjective image quality is likely to be visible.

Another concrete example will be described with respect to this problem.

FIGS. 17 and 18 are views for explaining an example of an encoder that executes quantization control on the basis of the hypothetical video buffer occupancy, respectively. FIG. 17 shows the generated bit per unit time, and FIG. 18 shows the hypothetical video buffer occupancy per unit time.

In FIG. 17, as similar to FIG. 15, the generated bit largely exceeds the target bit at time=$T_1$ due to drastic changes in the input picture, a scene change, or the like. Therefore, the encoder controls a generating bit so as to be decreased by increasing the quantization parameter at subsequent time=$T_2$ because the hypothetical video buffer occupancy is larger than 0 at time=$T_1$.

Specifically, although the generated bit becomes close to the target bit at time=$T_2$, the encoder controls a generating bit so as to be decreased by increasing the quantization parameter because the hypothetical video buffer occupancy is larger than 0 at time=$T_2$. Therefore, the generated bit is decreased with respect to the target bit at time=$T_3$.

As described above, the quantization control on the basis of the hypothetical video buffer occupancy is not likely to cause the buffer collapse compared to the quantization control on the basis of the generated bit. However, there is a problem that a convergence time required to reach the target bit becomes long and a range of the generating bit is widen, and thus deterioration in the visual image quality is likely to be visible.

The present invention has been made in consideration of such the problems in the conventional technique. The present invention provides an image coding apparatus and an image coding program in which a quantization control on the basis of the generated bit and a quantization control on the basis of the remaining video buffer capacity are provided by quantization control means and a convergence time required to reach the target bit can be shortened while collapse of the video buffer can be prevented by adaptively combining the quantization control means.

The present invention provides an image coding apparatus including: a quantization unit for encoding image data on the basis of a quantization parameter that has been set; a video buffer unit including a video buffer memory for outputting the encoded image data; a generated bit measurement unit for measuring a generated bit per predetermined time unit in the quantization unit; a target bit setting unit for holding a target bit per predetermined time unit; a residual bit computing unit for computing a residual value between the generated bit measured by the generated bit measurement unit and the target bit; a remaining video buffer capacity measurement unit for measuring the remaining video buffer capacity of the video buffer unit per predetermined time unit; and a quantization parameter computing unit for computing a quantization parameter to set the same to the quantization unit. The quantization parameter computing unit computes a quantization parameter for the next image data to be encoded, on the basis of at least one of the residual value computed and the remaining video buffer capacity measured.

According to the present invention, there is an advantage that a quantization control on the basis of the generated bit and a quantization control on the basis of the remaining video buffer capacity are adaptively selected or combined, and thus a convergence time required to reach the target bit can be shortened while collapse of the video buffer due to a large difference between the generated bit and the target bit can be prevented.

BRIEF DESCRIPTION OF THE DRAWINGS

FIG. 16 is a diagram showing the hypothetical video buffer occupancy per unit time of the conventional encoder that executes a quantization control on the basis of the generated bit;

FIG. 17 is a diagram showing the generated bit per unit time by a conventional encoder that executes a quantization control on the basis of the generated bit; and FIG. 18 is a diagram showing the hypothetical video buffer occupancy per unit time of the conventional encoder that executes a quantization control on the basis of the generated bit.

DETAILED DESCRIPTION OF THE PREFERRED EMBODIMENT

Hereinafter, embodiments of the present invention will be described with reference to the drawings.

First Embodiment

Figure 1:
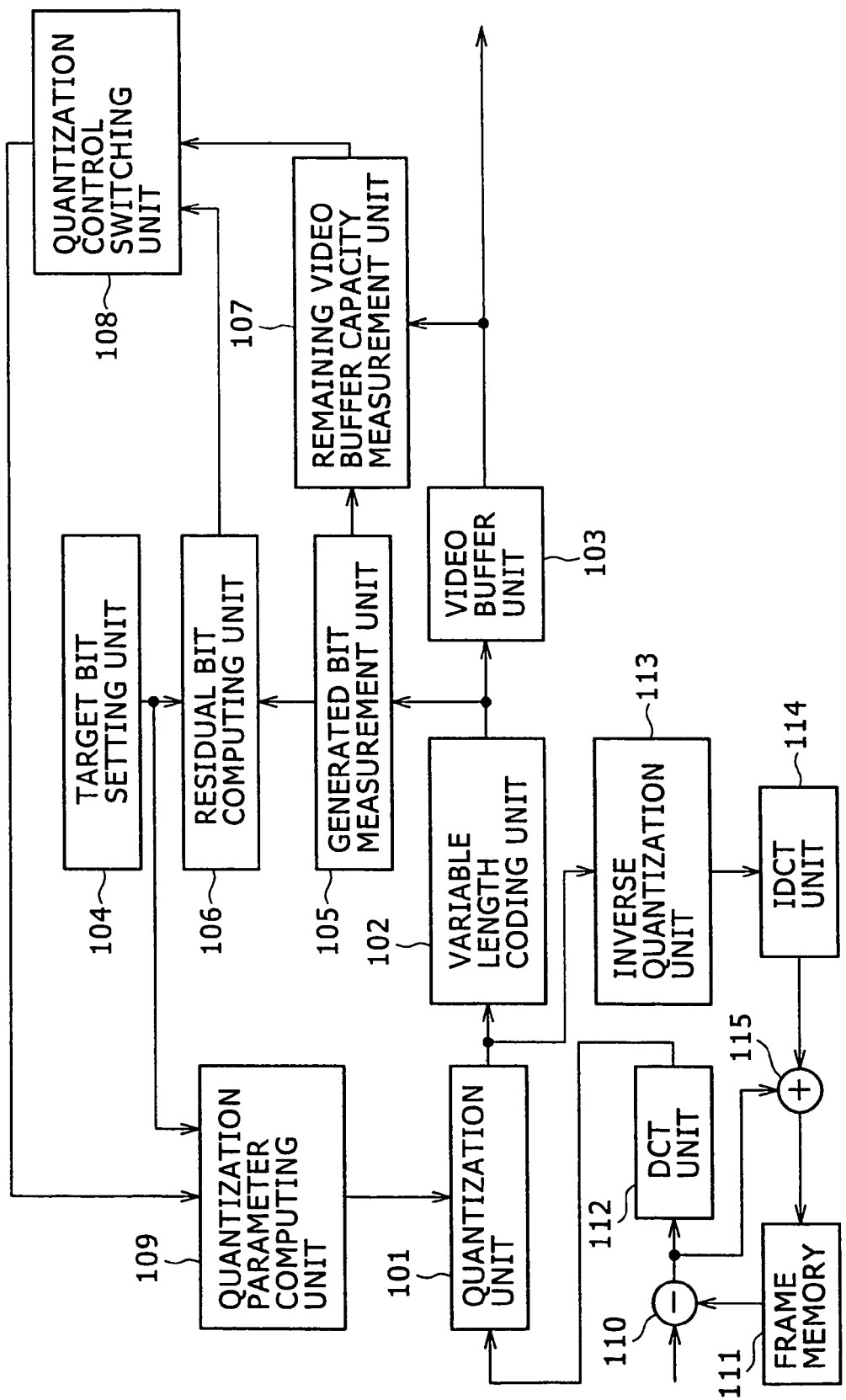
FIG. 1 is a configuration block diagram of an image coding apparatus according to a first embodiment of the present invention.

FIG. 1 is a configuration block diagram of an image coding apparatus according to a first embodiment of the present invention.

The image coding apparatus shown in FIG. 1 includes a quantization unit 101, a variable length coding unit 102, a video buffer unit 103, a target bit setting unit 104, a generated bit measurement unit 105, a residual bit computing unit 106, a remaining video buffer capacity measurement unit 107, a quantization control switching unit 108, a quantization parameter computing unit 109, a subtracter 110, a frame memory 111, a DCT unit 112, an inverse quantization unit 113, an IDCT unit 114, and an adder 115.

Note that each of these units may be configured by hardware, software, or a module configured by combining hardware and software.

Hereinafter, an operation of the image coding apparatus shown in FIG. 1 will be described.

A video signal is divided by an image block division apparatus (not shown). The divided image block is input to the DCT unit 112 through the subtracter 110. The DCT unit 112 performs the discrete cosine transform for the input data on an image block basis to output the resultant to the quantization unit 101.

The quantization unit 101 quantizes the input data subjected to the DCT by using a quantization parameter computed by the quantization parameter computing unit 109. The quantized data is input to the variable length coding unit 102 where the variable length coding is performed for the input data. The data encoded by the variable length coding unit 102 is once stored in the video buffer unit 103 where the input coded data is output in accordance with a bit of a transmission line.

On the other hand, the quantized data generated by the quantization unit 101 is input to the inverse quantization unit 113. The inverse quantization unit 113 performs an inverse quantization for the quantized data. The image block subjected to the inverse quantization is input to the IDCT unit 114. The IDCT unit 114 performs an inverse discrete cosine transform for the inverse-quantized image block to restore the same as a residual block. The restored residual block is once stored in the frame memory 111 as a local decoded image block through the adder 115. The local decoded image block and the input image block are input to the subtracter 110 and the resultant is output to the DCT unit 112.

The image coding apparatus of the present invention quantizes a signal which has the image data redundancy removed by the Motion Compensated Prediction and the DCT using the hybrid coding so as to quantize the data for compression. The variable length coding is performed for the quantized data together with supplemental information such as the motion compensated data and the coding mode. The encoded data is once accumulated in the transmitting video buffer so as to be output in accordance with a bit of a transmission line.

Since the spatial correlativity and the temporal correlativity are changed every time the input image is changed, the bit subjected to the DCT is changed according thereto. In order to make a generating bit correspond to a desired target bit, there needs a quantization control that adaptively changes a quantization parameter of the quantization unit 101.

In a relationship between a quantization parameter and a generating bit, in general, as a quantization parameter becomes larger, a generating bit becomes smaller. On the contrary, as a quantization parameter becomes smaller, a generating bit becomes larger. In the case where the quantization control is not adaptively carried out, a generating bit differs largely from the target bit when drastic changes in the input image such as a scene change occurs. In such a case, it takes a time to correct the variation in a generating bit. Therefore, deterioration in the image quality can be easily detected in the above-described case.

Further, collapse of the video buffer such as buffer underflow and buffer overflow may occur depending on the difference between the generated bit and the target bit, which results in significant deterioration in the image quality of the decoded image. Accordingly, an appropriate quantization control is an important function for improving the image quality and for continuing stable coding and decoding operations.

Next, quantization control according to the first embodiment by which a quantization parameter is computed will be described.

The generated bit measurement unit 105 measures a bit per predetermined time unit that is output from the variable length coding unit 102, and then outputs the resultant to the residual bit computing unit 106. In addition, a target bit per predetermined time unit is set in advance to the target bit setting unit 104 and stored therein to be output to the residual bit computing unit 106.

The residual bit computing unit 106 computes a residual value between the generated bit measured by the generated bit measurement unit 105 and the target bit per predetermined time unit stored in the target bit setting unit 104 to output the resultant to the quantization control switching unit 108.

The remaining video buffer capacity measurement unit 107 measures the remaining video buffer capacity of the video buffer unit 103 per predetermined time unit to output the same to the quantization control switching unit 108.

The quantization control switching unit 108 determines which of the residual value computed by the residual bit computing unit 106 and the remaining video buffer capacity measured by the remaining video buffer capacity measurement unit 107 is used for determining a quantization parameter that is set to the next image data to be encoded.

The quantization parameter computing unit 109 determines a quantization parameter that is set to the next image data to be encoded by using one of the remaining video buffer capacity and the residual value on the basis of the result determined by the quantization control switching unit 108.

That is, the image coding apparatus executes a quantization control on the basis of the remaining video buffer capacity in the case where the remaining video buffer capacity is determined by the quantization control switching unit 108. On the other hand, the image coding apparatus executes a quantization control on the basis of the generated bit in the case where the residual value is determined by the quantization control switching unit 108.

Note that the above-described "per predetermined time unit" is based on one frame unit. In the case where the input image is an interlaced signal, one field may be used as a predetermined time unit. Alternatively, one frame is divided into plural blocks and one of them may be used as a predetermined time unit. Further, in the case where a coding mode (I picture, P picture and B picture) is changed per frame unit, one Group of Pictures (GOP) may be used as a predetermined time unit.

Next, an operation of the quantization control switching unit 108 will be described in detail.

Figure 2:
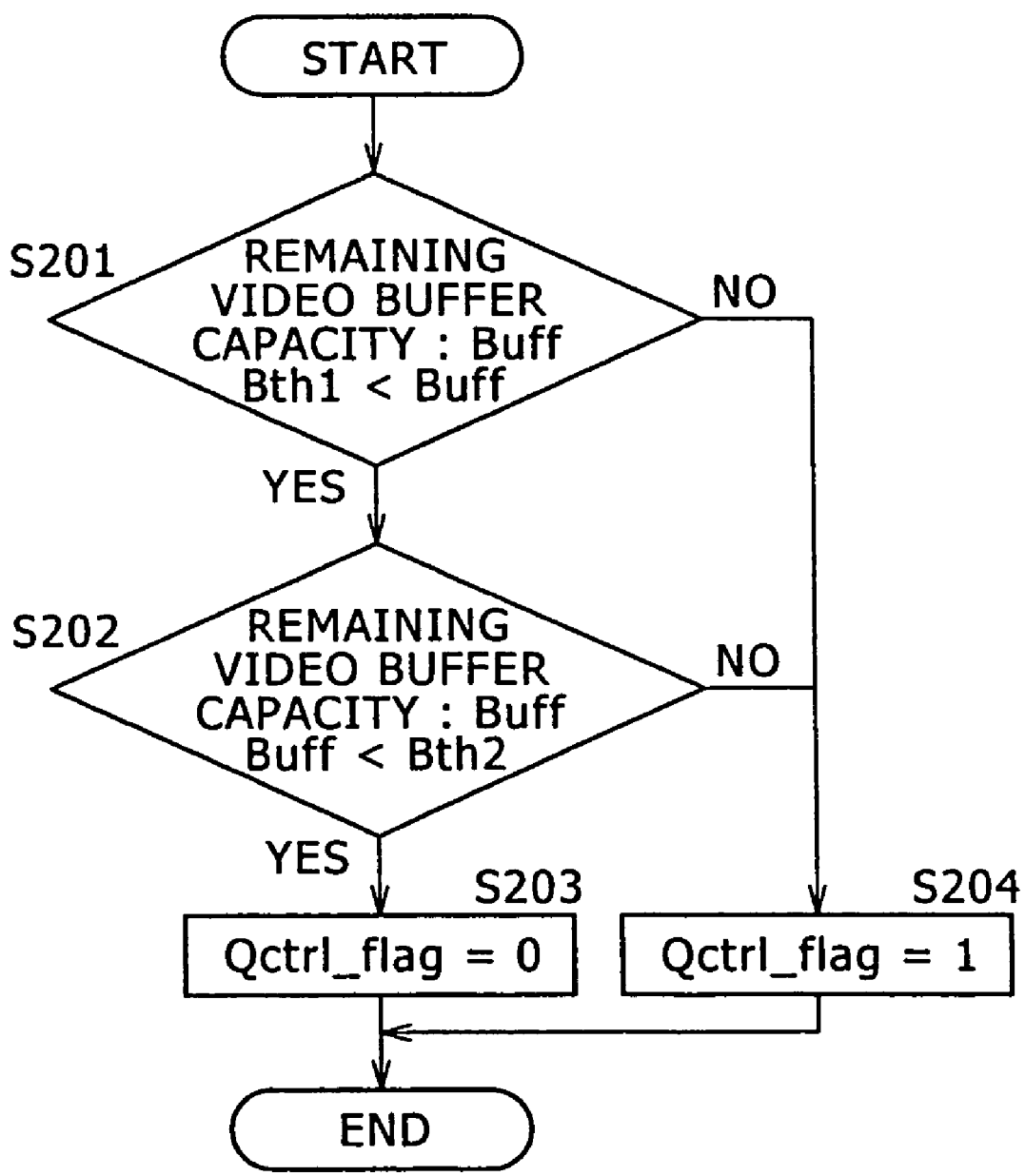
FIG. 2 is a flowchart showing a process of a quantization control switching unit according to the first embodiment of the present invention.

FIG. 2 is a flowchart showing a process of the quantization control switching unit 108.

The remaining video buffer capacity measured per predetermined time unit by the remaining video buffer capacity measurement unit 107 is input to the quantization control switching unit 108. This remaining video buffer capacity is represented by Buff.

The quantization control switching unit 108 compares a magnitude correlation between the input remaining video buffer capacity Buff and the predetermined minimum threshold Bth1 (S201). In the case where the compared result shows that the remaining video buffer capacity Buff is larger than the minimum threshold Bth1, the step proceeds to S202. On the other hand, in the case where the compared result shows that the remaining video buffer capacity Buff is equal to or smaller than the minimum threshold Bth1, the step proceeds to S204.

Next, the quantization control switching unit 108 compares a magnitude correlation between the input remaining video buffer capacity Buff and the predetermined maximum threshold Bth2 (S202). In the case where the compared result shows that the remaining video buffer capacity Buff is smaller than the maximum threshold Bth2, the step proceeds to S203. On the other hand, in the case where the compared result shows that the remaining video buffer capacity Buff is equal to or larger than the maximum threshold Bth2, the step proceeds to S204.

Note that the minimum threshold Bth1 and the maximum threshold Bth2 satisfy the magnitude correlation represented by the following Formula 1.

$$Bth1 < Bth2 \qquad \text{[Formula 1]}$$

In the case where the results of S201 and S202 satisfy the condition of Bth1<Buff<Bth2, the step proceeds to S203 where the quantization control switching unit 108 sets a quantization control identification flag Qctrl_flag to 0.

In the case where the results of S201 and S202 satisfy the condition of Buff≦Bth1 or Bth2≦Buff, the step proceeds to S204 where the quantization control switching unit 108 sets the quantization control identification flag Qctrl_flag to 1.

The quantization control identification flag Qctrl_flag is a flag for selecting one of the remaining video buffer capacity and the generated bit for use in determining a quantization parameter by the quantization parameter computing unit 109.

The quantization parameter computing unit 109 refers to the quantization control identification flag Qctrl_flag determined by the quantization control switching unit 108. In the case of Qctrl_flag=0, quantization control is executed on the basis of the generated bit. On the other hand, in the case of Qctrl_flag=1, quantization control is executed on the basis of the value of the remaining video buffer capacity.

In the case where the result of the process in FIG. 2 shows that the remaining video buffer capacity of the video buffer unit 103 is larger than the predetermined minimum threshold and smaller than the predetermined maximum threshold, the image coding apparatus executes quantization control on the basis of the generated bit. Accordingly, a convergence time required to reach the target bit can be reduced. Alternatively, in the case where the result of the process in FIG. 2 shows that the remaining video buffer capacity of the video buffer unit 103 is smaller than the predetermined minimum threshold or larger than the predetermined maximum threshold, the image coding apparatus executes quantization control on the basis of the remaining video buffer capacity. Accordingly, the video buffer can be prevented from collapsing.

Figure 3:
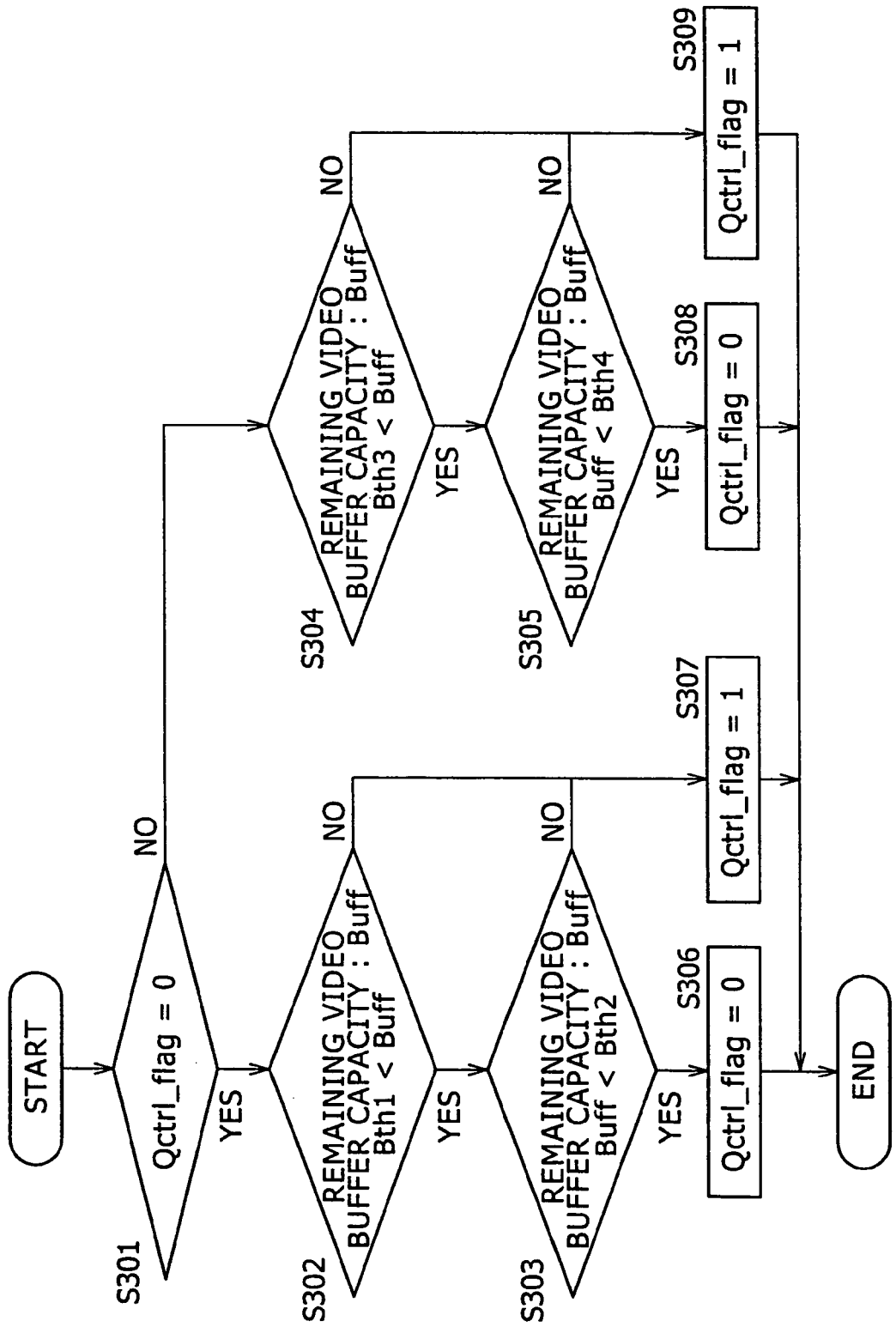
FIG. 3 is a flowchart showing another process of the quantization control switching unit according to the first embodiment of the present invention.

FIG. 3 is a flowchart showing another process of the quantization control switching unit 108.

In the example of FIG. 3, the minimum threshold Bth3 and the maximum threshold Bth4 are used in addition to the minimum threshold Bth1 and the maximum threshold Bth2.

Note that these four thresholds satisfy the magnitude correlation represented by the following Formula 2.

$$Bth1 < Bth3 < Bth4 < Bth2 \qquad \text{[Formula 2]}$$

The remaining video buffer capacity measured per predetermined time unit by the remaining video buffer capacity measurement unit 107 is input to the quantization control switching unit 108. This remaining video buffer capacity is represented by Buff.

In the first place, the quantization control switching unit 108 determines whether or not the quantization control identification flag Qctrl_flag is 0 (S301). In the case where the quantization control identification flag Qctrl_flag is 0, the step proceeds to S302. In the case where the quantization control identification flag Qctrl_flag is not 0, that is, Qctrl_flag is 1, the step proceeds to S304.

Next, the quantization control switching unit 108 compares a magnitude correlation between the input remaining video buffer capacity Buff and the predetermined minimum threshold Bth1 (S302). In the case where the compared result shows that the remaining video buffer capacity Buff is larger than the minimum threshold Bth1, the step proceeds to S303. On the other hand, in the case where the compared result shows that the remaining video buffer capacity Buff is equal to or smaller than the minimum threshold Bth1, the step proceeds to S307.

Next, the quantization control switching unit 108 compares a magnitude correlation between the input remaining video buffer capacity Buff and the predetermined maximum threshold Bth2 (S303). In the case where the compared result shows that the remaining video buffer capacity Buff is smaller than the maximum threshold Bth2, the step proceeds to S306. On the other hand, in the case where the compared result shows that the remaining video buffer capacity Buff is equal to or larger than the maximum threshold Bth2, the step proceeds to S307.

In the case where the results of S302 and S303 satisfy the condition of Bth1<Buff<Bth2, the step proceeds to S306 where the quantization control switching unit 108 sets the quantization control identification flag Qctrl_flag to 0.

In the case where the results of S302 and S303 satisfy the condition of Buff≦Bth1 or Bth2≦Buff, the step proceeds to S307 where the quantization control switching unit 108 sets the quantization control identification flag Qctrl_flag to 1.

On the other hand, the quantization control switching unit 108 compares a magnitude correlation between the input remaining video buffer capacity Buff and the predetermined minimum threshold Bth3 (S304). In the case where the compared result shows that the remaining video buffer capacity Buff is larger than the minimum threshold Bth3, the step proceeds to S305. On the other hand, in the case where the compared result shows that the remaining video buffer capacity Buff is equal to or smaller than the minimum threshold Bth3, the step proceeds to S309.

Next, the quantization control switching unit 108 compares a magnitude correlation between the input remaining video buffer capacity Buff and the predetermined maximum threshold Bth4 (S305). In the case where the compared result shows that the remaining video buffer capacity Buff is smaller than the maximum threshold Bth4, the step proceeds to S308. On the other hand, in the case where the compared result shows that the remaining video buffer capacity Buff is equal to or larger than the maximum threshold Bth4, the step proceeds to S309.

In the case where the results of S304 and S305 satisfy the condition of Bth3<Buff<Bth4, the step proceeds to S308 where the quantization control switching unit 108 sets the quantization control identification flag Qctrl_flag to 0.

In the case where the results of S304 and S305 satisfy the condition of Buff≦Bth3 or Bth4≦Buff, the step proceeds to S309 where the quantization control switching unit 108 sets the quantization control identification flag Qctrl_flag to 1.

In the process based on FIG. 3, when the remaining video buffer capacity is equal to or smaller than Bth1, the quantization control on the basis of the remaining video buffer capacity is continued until the remaining video buffer capacity exceeds Bth3 after the quantization control on the basis of the generated bit is switched to the quantization control on the basis of the remaining video buffer capacity. Therefore, there is at least a margin of Bth3-Bth1 after the quantization control on the basis of the generated bit is switched to the quantization control on the basis of the remaining video buffer capacity, and thus frequent switching between the quantization control on the basis of the generated bit and the quantization control on the basis of the remaining video buffer capacity can be prevented.

On the other hand, when the remaining video buffer capacity is equal to or larger than Bth2, there is also at least a margin of Bth2-Bth4 after the quantization control on the basis of the generated bit is switched to the quantization control on the basis of the remaining video buffer capacity. Thus, frequent switching between the quantization control on the basis of the generated bit and the quantization control on the basis of the remaining video buffer capacity can be prevented.

With regard to the above-described maximum threshold Bth2 and minimum threshold Bth1, the Maximum Coded Picture buffer (CPB) size in accordance with a level value of a resolution of the input picture is specified in, for example, the H.264/AVC standard. The maximum CPB size is the maximum size of a buffer that can accumulate the encoded data prior to decoding at the decoder side. Therefore, in a coding apparatus supporting the H.264/AVC standard, the compatibility to the H.264/AVC standard can be secured by setting Bth1=0 and Bth2=the maximum CPB size. Alternatively, a value smaller than the maximum CPB size is set to Bth2 and a value larger than 0 is set to Bth1, accordingly the effect of further preventing collapse of the video buffer can be obtained.

Figure 4:
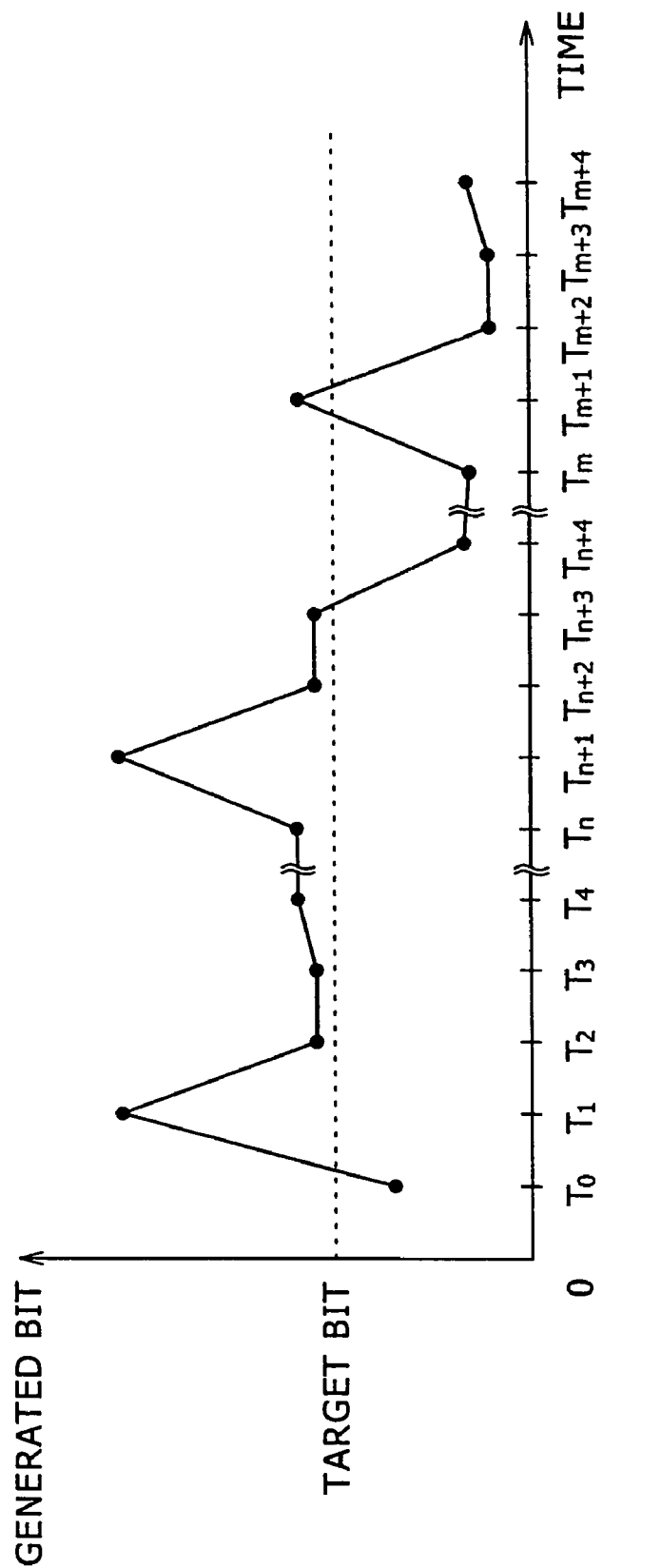
FIG. 4 is a view for explaining the generated bit per unit time according to the first embodiment of the present invention.
Figure 5:
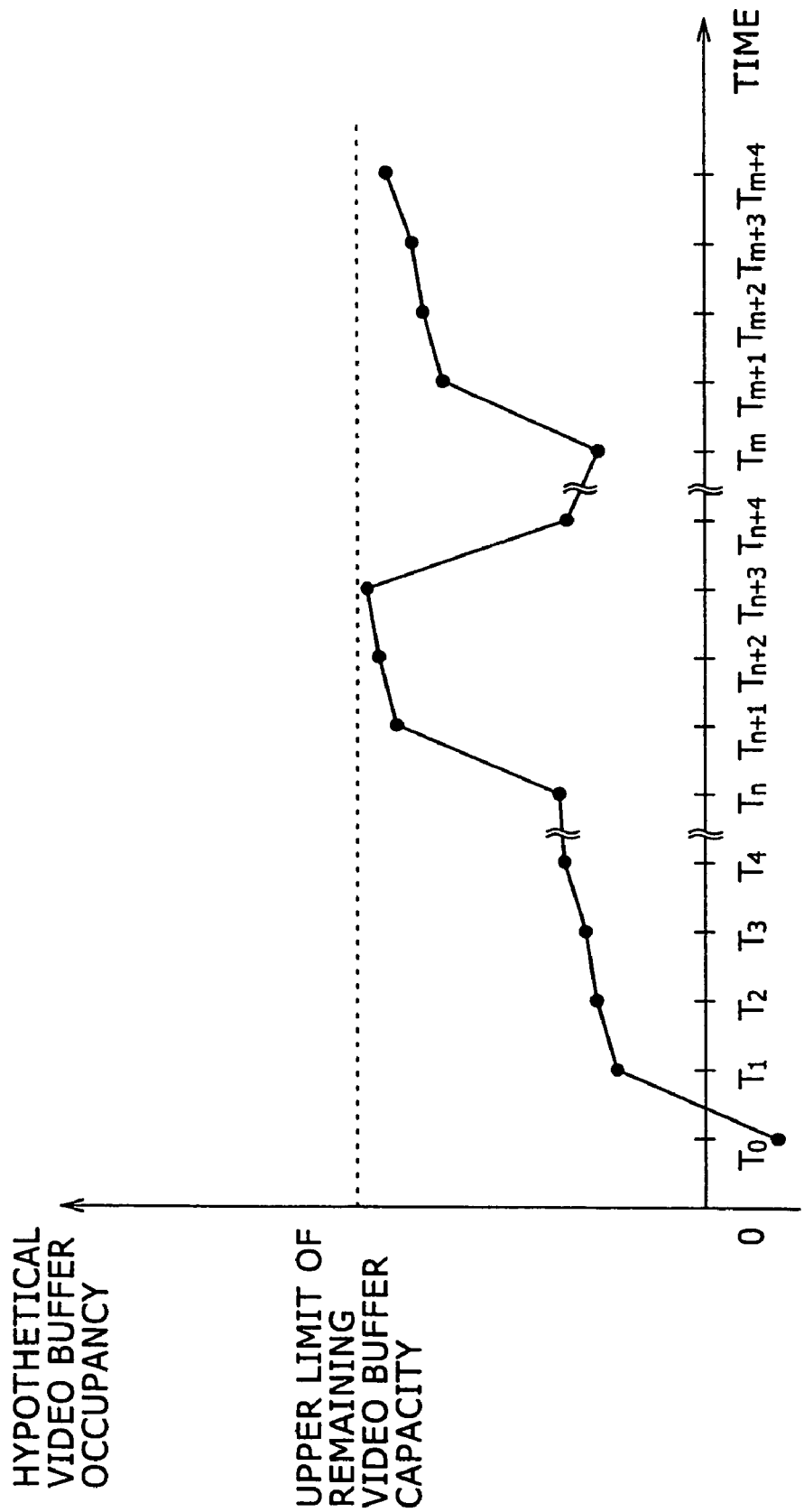
FIG. 5 is a view for explaining hypothetical video buffer occupancy per unit time according to the first embodiment of the present invention.

FIGS. 4 and 5 show one operational example of the image coding apparatus according to the first embodiment. FIG. 4 shows the generated bit per unit time and FIG. 5 shows the hypothetical video buffer occupancy per unit time.

In FIG. 4, the generated bit largely exceeds the target bit at time=$T_1$ due to drastic changes in the input picture, a scene change, or the like. Further, in FIG. 5, the hypothetical video buffer occupancy is smaller than the upper limit of the remaining video buffer capacity at time=$T_1$. The quantization control switching unit 108 consequently sets the quantization control identification flag Qctrl_flag to 0 in S203 based on the flowchart of FIG. 2. The quantization parameter computing unit 109 accordingly computes a quantization parameter on the basis of the generated bit to encode the image data in the quantization unit 101. As a result, the generated bit becomes closer to the target bit at time $T_2$.

At time $T_{n+1}$ the same control as described above makes the generated bit closer to the target bit.

At time $T_{n+3}$, the generated bit becomes closer to the target bit. However, the hypothetical video buffer occupancy becomes closer to the upper limit of the remaining video buffer capacity at time $T_{n+3}$. The quantization control switching unit 108 consequently sets the quantization control identification flag Qctrl_flag to 1 in S204 based on the flowchart of FIG. 2. The quantization parameter computing unit 109 accordingly computes a quantization parameter on the basis of the remaining video buffer capacity to encode the image data in the quantization unit 101. As a result, the hypothetical video buffer occupancy becomes smaller than the upper limit of the remaining video buffer capacity at time $T_{n+4}$.

As described above, the image coding apparatus according to the first embodiment executes quantization control on the basis of the generated bit or quantization control on the basis of the remaining video buffer capacity. To be more concrete, in the case where the remaining video buffer capacity of the video buffer unit 103 is larger than the predetermined minimum threshold and smaller than the predetermined maximum threshold, the image coding apparatus executes quantization control on the basis of the generated bit, thus reducing a convergence time required to reach the target bit. Alternatively, in the case where the remaining video buffer capacity of the video buffer unit 103 is smaller than the predetermined minimum threshold or larger than the predetermined maximum threshold, the image coding apparatus executes a quantization control on the basis of the remaining video buffer capacity, thus preventing the video buffer from collapsing.

Second Embodiment

Next, the second embodiment according to the present invention will be described.

Figure 6:
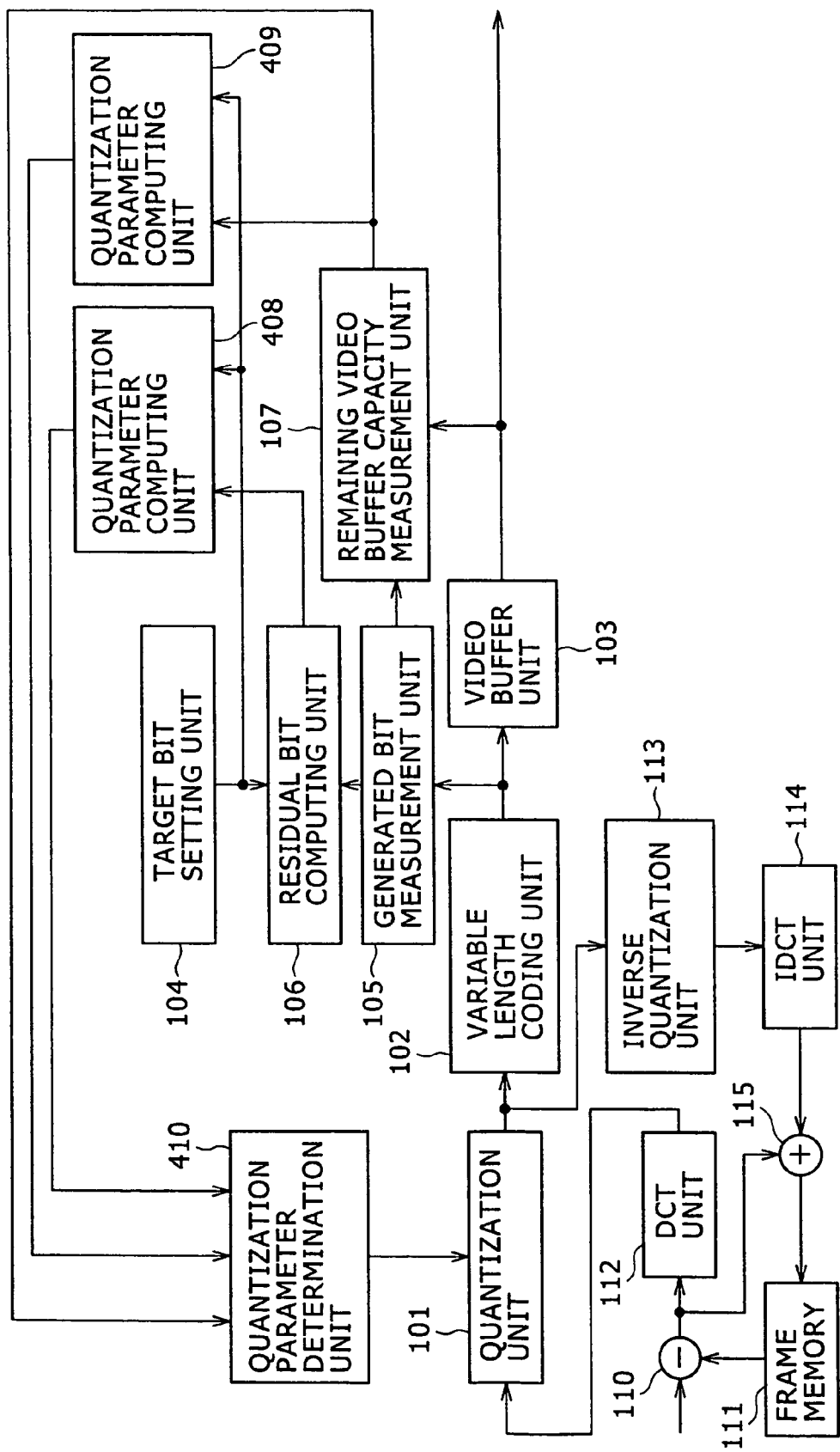
FIG. 6 is a configuration block diagram of an image coding apparatus according to a second embodiment of the present invention.

FIG. 6 is a configuration block diagram of an image coding apparatus according to the second embodiment of the present invention Note that the elements having the same functions as those in the first embodiment will be given the same numerals, and the explanation thereof will be omitted.

The image coding apparatus shown in FIG. 6 includes the quantization unit 101, the variable length coding unit 102, the video buffer unit 103, the target bit setting unit 104, the generated bit measurement unit 105, the residual bit computing unit 106, the remaining video buffer capacity measurement unit 107, quantization parameter computing units 408, 409, a quantization parameter determination unit 410, a subtracter 110, the frame memory 111, the DCT unit 112, the inverse quantization unit 113, the IDCT unit 114, and the adder 115.

Hereinafter, quantization control of the image coding apparatus according to the second embodiment will be described.

The generated bit measurement unit 105 measures a bit per predetermined time unit that is output from the variable length coding unit 102, as in the case with the above-described first embodiment. In addition, the target bit setting unit 104 stores a predetermined target bit per predetermined time unit.

The residual bit computing unit 106 computes a residual value between the generated bit measured by the generated bit measurement unit 105 and the target bit per predetermined time unit set by the target bit setting unit 104.

The remaining video buffer capacity measurement unit 107 measures the remaining video buffer capacity of the video buffer unit 103 per predetermined time unit.

The quantization parameter computing unit 408 computes a quantization parameter that is set to the next image data to be encoded, on the basis of the target bit set by the target bit setting unit 104 and the residual value computed by the residual bit computing unit 106.

The quantization parameter computing unit 409 computes a quantization parameter that is set to the next image data to be encoded on the basis of the target bit set by the target bit setting unit 104 and the remaining video buffer capacity measured by the remaining video buffer capacity measurement unit 107.

The quantization parameter determination unit 410 determines, for the quantization of the image data, the way of using the quantization parameter computed by the quantization parameter computing unit 408 and the quantization parameter computed by the quantization parameter computing unit 409, on the basis of the remaining video buffer capacity measured by the remaining video buffer capacity measurement unit 107.

Next, an operation of the quantization parameter determination unit 410 will be described.

First, the quantization parameter computed by the quantization parameter computing unit 408 is represented by QP_bit and the quantization parameter computed by the quantization parameter computing unit 409 is represented by QP_buf. Further, the final quantization parameter to be determined by the quantization parameter determination unit 410, that is, the quantization parameter set to the next image data to be encoded is represented by QP_final.

At this time, the quantization parameter determination unit 410 determines the quantization parameter QP_final by using the following Formula 3.

$$QP\_final = (1-\alpha) \times QP\_bit + \alpha \times QP\_buf (0 \leq \alpha \leq 1) \quad \text{[Formula 3]}$$

Note that $\alpha$ is a weight coefficient that determines a ratio of QP_bit and QP_buf.

The value of the weight coefficient $\alpha$ is determined by using the remaining video buffer capacity measured by the remaining video buffer capacity measurement unit 107.

Figure 7:
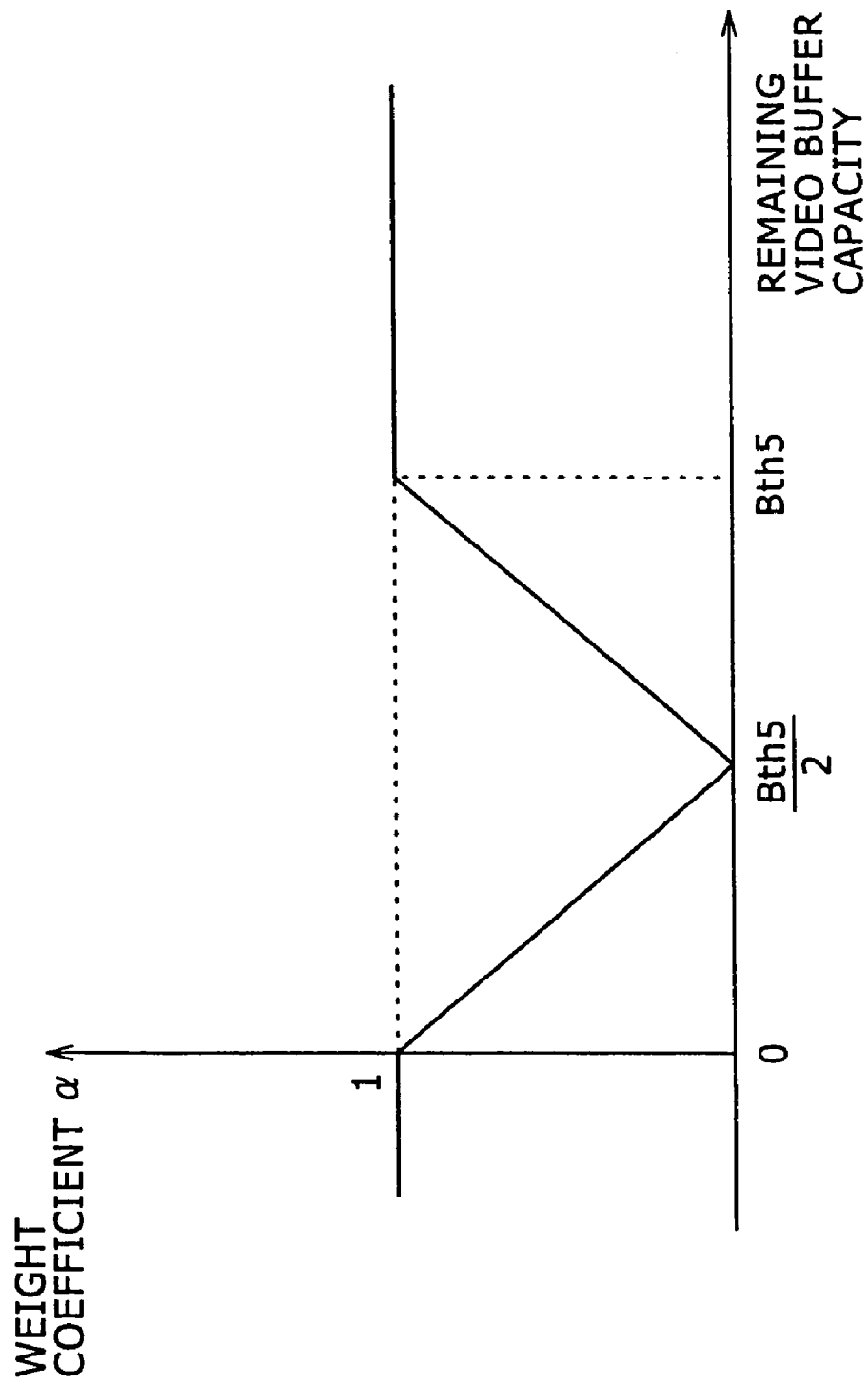
FIG. 7 is a setting example of a weight coefficient α according to the second embodiment of the present invention.

FIG. 7 is a view for explaining a setting example of the weight coefficient $\alpha$ of the quantization parameter determination unit 410.

The quantization parameter determination unit 410 preliminarily sets the minimum threshold and the maximum threshold of the remaining video buffer capacity to 0 and Bth5, respectively. When the remaining video buffer capacity is the intermediate value (Bth5/2) between the minimum threshold and the maximum threshold, the weight coefficient $\alpha$ is 0. As the remaining video buffer capacity becomes closer to the minimum threshold 0 or the maximum threshold Bth5, $\alpha$ becomes larger.

As a result, as the remaining video buffer capacity becomes closer to the minimum threshold or the maximum threshold, the quantization parameter determination unit 410 controls so as to determine a quantization parameter by largely weighting a quantization control on the basis of the remaining video buffer capacity.

Figure 8:
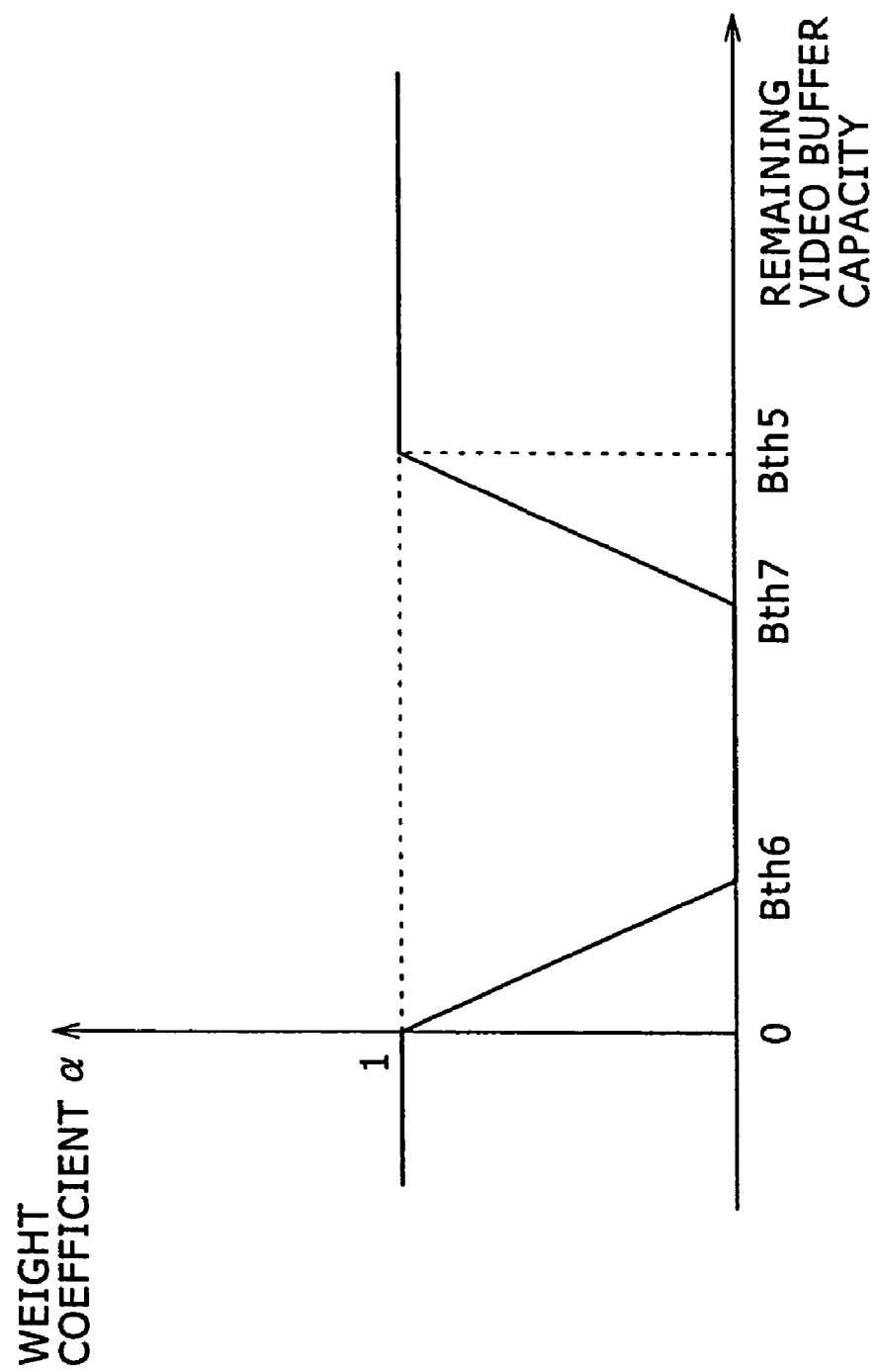
FIG. 8 is another setting example of the weight coefficient α according to the second embodiment of the present invention.

FIG. 8 is a view for explaining another setting example of the weight coefficient $\alpha$ of the quantization parameter determination unit 410.

In FIG. 8, in order to explain the characteristics of the weight coefficient $\alpha$, the minimum threshold Bth6 and the maximum threshold Bth7 are used in addition to the minimum threshold 0 and the maximum threshold Bth5 used in FIG. 7.

As a result, the quantization parameter determination unit 410 sets $\alpha$ to 0 when the remaining video buffer capacity is larger than Bth6 and smaller than Bth7. Consequently, variation in the quantization parameter becomes smaller to changes in the remaining video buffer capacity as compared to the control in FIG. 7.

As described above, on the basis of the value of the remaining video buffer capacity, the image coding apparatus according to the second embodiment determines a quantization parameter set to the next image data to be encoded by combining the quantization parameter computed on the basis of the generated bit with the quantization parameter set on the basis of the remaining video buffer capacity. To be more concrete, the image coding apparatus determines, based on the remaining video buffer capacity, a quantization parameter set to the next image data to be encoded by changing the weighting of the two quantization parameters.

As a result, in the case where the remaining video buffer capacity is close to the intermediate value between the maximum threshold and the minimum threshold, a convergence time required to reach the target bit can be reduced by largely weighting the quantization parameter computed on the basis of the generated bit. On the other hand, in the case where the remaining video buffer capacity becomes closer to the maximum threshold or the minimum threshold, collapse of the video buffer of an encoder or a decoder can be prevented by largely weighting the quantization parameter on the basis of the remaining video buffer capacity.

In the above-described first embodiment, the quantization control on the basis of the generated bit and the quantization control on the remaining video buffer capacity are switched to control a generating bit. In the second embodiment, since the weight coefficient is controlled depending on the value of the remaining video buffer capacity, variation in the quantization parameter at the time of the switching becomes smoother and rapid variation in the quantization parameter can be suppressed as compared to the first embodiment. Accordingly, rapid variation in the subjective image quality can be suppressed.

Third Embodiment

Next, the third embodiment according to the present invention will be described.

Figure 9:
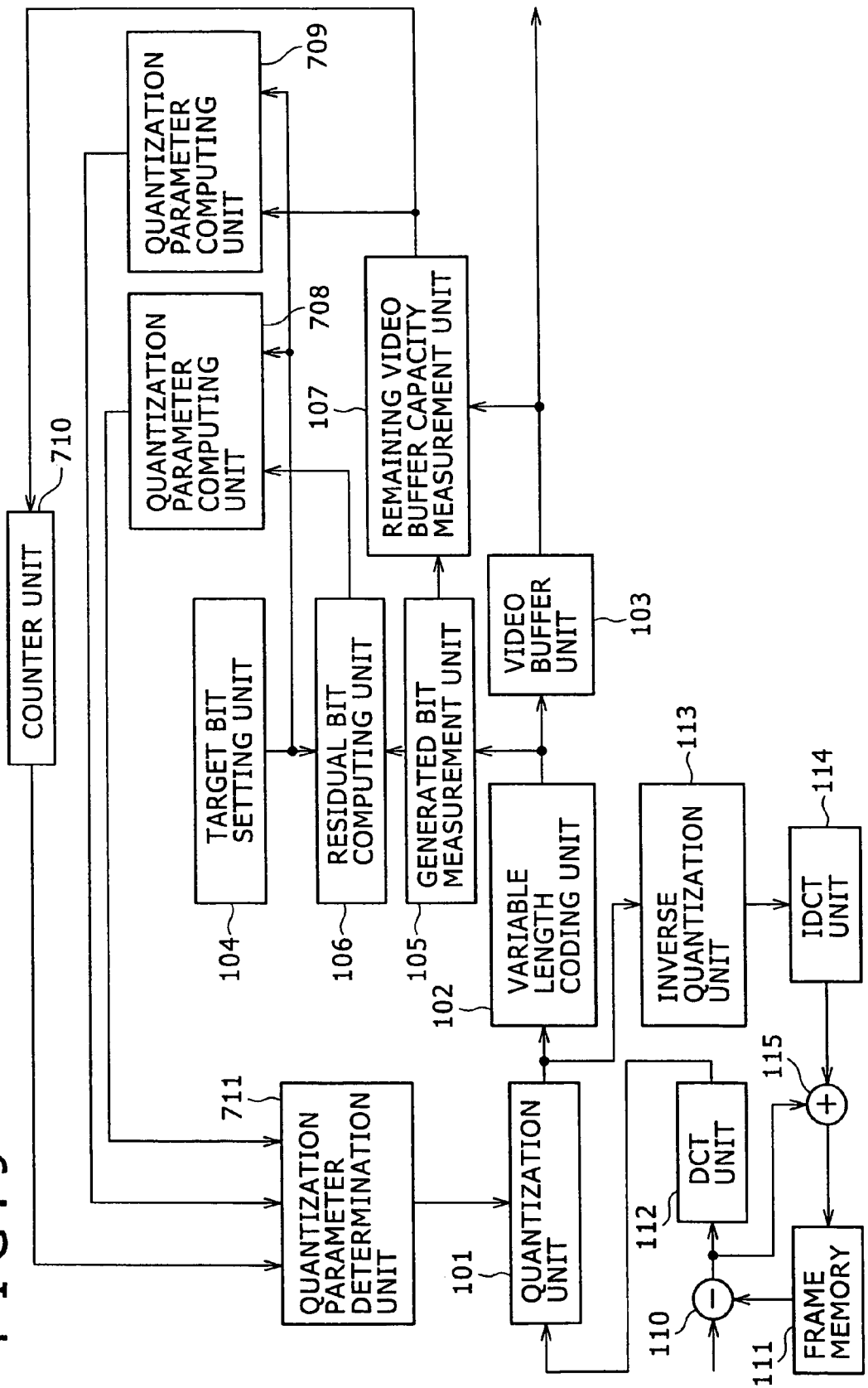
FIG. 9 is a configuration block diagram of an image coding apparatus according to a third embodiment of the present invention.

FIG. 9 is a configuration block diagram of an image coding apparatus according to the third embodiment of the present invention.

Note that the elements having the same functions as those in the first and second embodiments will be given the same numerals, and the explanation thereof will be omitted.

The image coding apparatus shown in FIG. 9 includes the quantization unit 101, the variable length coding unit 102, the video buffer unit 103, the target bit setting unit 104, the generated bit measurement unit 105, the residual bit computing unit 106, the remaining video buffer capacity measurement unit 107, quantization parameter computing units 708, 709, a counter unit 710, a quantization parameter determination unit 710, the subtracter 110, the frame memory 111, the DCT unit 112, the inverse quantization unit 113, the IDCT unit 114, and the adder 115.

Hereinafter, an operation of the image coding apparatus according to the third embodiment will be described.

The generated bit measurement unit 105 measures a bit per predetermined time unit that is output from the variable length coding unit 102 as in the case with the above-described first embodiment. In addition, the target bit setting unit 104 stores a predetermined target bit per predetermined time unit.

The residual bit computing unit 106 computes a residual value between the generated bit measured by the generated bit measurement unit 105 and the target bit per predetermined time unit set by the target bit setting unit 104.

The remaining video buffer capacity measurement unit 107 measures the remaining video buffer capacity of the video buffer unit 103 per predetermined time unit.

The quantization parameter computing unit 708 computes a quantization parameter that is set to the next image data to be encoded on the basis of the target bit set by the target bit setting unit 104 and the residual value computed by the residual bit computing unit 106.

The quantization parameter computing unit 709 computes a quantization parameter that is set to the next image data to be encoded, on the basis of the target bit set by the target bit setting unit 104 and the remaining video buffer capacity measured by the remaining video buffer capacity measurement unit 107.

The counter unit 710 adds 1 to or subtracts 1 from a counter value on the basis of the remaining video buffer capacity measured by the remaining video buffer capacity measurement unit 107.

The quantization parameter determination unit 711 determines, for the quantization of the image data, the way of using the quantization parameter computed by the quantization parameter computing unit 708 and the quantization parameter computed by the quantization parameter computing unit 709, on the basis of the counter value that has been output from the counter unit 710.

Figure 10:
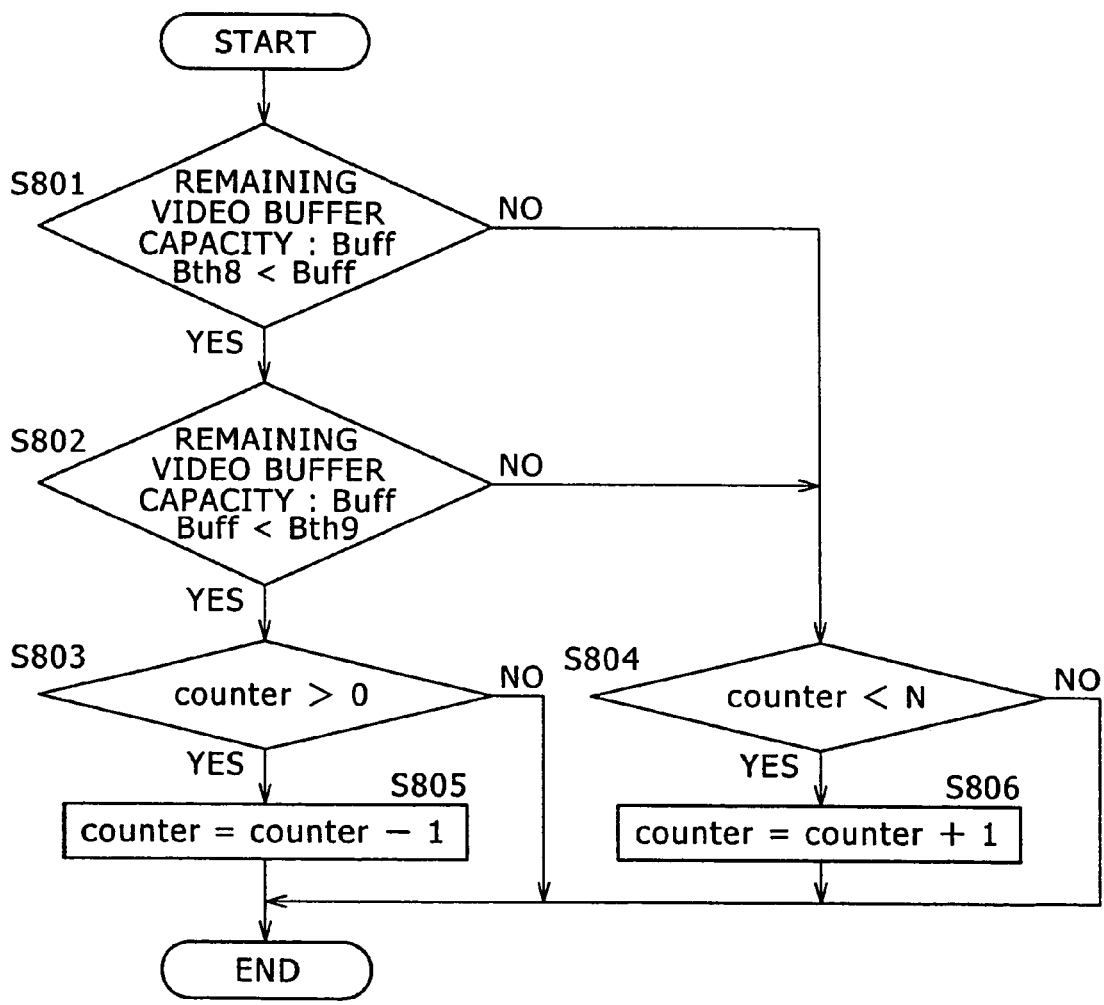
FIG. 10 is a flowchart showing a process of a counter unit according to the third embodiment of the present invention.

FIG. 10 is a flowchart showing a process of the counter unit 710.

The remaining video buffer capacity measured per predetermined time unit by the remaining video buffer capacity measurement unit 107 is input to the counter unit 710. This remaining video buffer capacity is represented by Buff.

The counter unit 710 compares a magnitude correlation between the input remaining video buffer capacity Buff and the predetermined minimum threshold Bth8 (S801).

In the case where the compared result shows that the remaining video buffer capacity Buff is larger than the minimum threshold Bth8, the step proceeds to S802. On the other hand, in the case where the compared result shows that the remaining video buffer capacity Buff is equal to or smaller than the minimum threshold Bth8, the step proceeds to S804.

Next, the counter unit 710 compares a magnitude correlation between the input remaining video buffer capacity Buff and the predetermined maximum threshold Bth9 (S802).

In the case where the compared result shows that the remaining video buffer capacity Buff is smaller than the maximum threshold Bth9, the step proceeds to S803. On the other hand, in the case where the compared result shows that the remaining video buffer capacity Buff is equal to or larger than the maximum threshold Bth9, the step proceeds to S804.

Note that the two thresholds satisfy a magnitude correlation represented by the following Formula 4.

$$Bth8 < Bth9 \qquad \text{[Formula 4]}$$

In the case where the results of S801 and S802 satisfy the condition of Bth8<Buff<Bth9, the step proceeds to S803.

In S803, it is determined whether or not a current counter value "counter" is larger than 0. In the case of the current counter value "counter">0, the step proceeds to S805 to complete the process by subtracting 1 from the counter value "counter".

On the other hand, in the case of the current counter value "counter"=0, the process is completed without executing S805.

In the case where the results of S801 and S802 satisfy the condition of Buff≦Bth8 or Bth9≦Buff, the step proceeds to S804.

In S804, it is determined whether or not the current counter value "counter" is smaller than the predetermined maximum value N. In the case of the current counter value "counter"<N, the step proceeds to S806 to complete the process by adding 1 to the current counter value "counter".

On the other hand, in the case of the current counter value counter≧N, the process is completed without executing S806.

In the case where the result of the process in FIG. 10 shows that the remaining video buffer capacity of the video buffer unit 103 is larger than the predetermined minimum threshold and smaller than the predetermined maximum threshold, and further the current counter value is larger than 0, the counter unit 710 subtracts 1 from the counter value. Alternatively, in the case where the result of the process in FIG. 10 shows that the remaining video buffer capacity of the video buffer unit 103 is smaller than the predetermined minimum threshold or larger than the predetermined maximum threshold, and further the current counter value is smaller than the maximum value N, the counter unit 710 adds 1 to the counter value.

Next, an operation of the quantization parameter determination unit 711 will be described.

First, the quantization parameter computed by the quantization parameter computing unit 708 is represented by QP_bit and the quantization parameter computed by the quantization parameter computing unit 709 is represented by QP_buf. Further, the final quantization parameter determined by the quantization parameter determination unit 711 is represented by QP_final.

At this time, the quantization parameter determination unit 711 determines the quantization parameter QP_final by using the following Formula 5.

$$QP\_final = (1-\alpha) \times QP\_bit + \alpha \times QP\_buf \quad (0 \leq \alpha \leq 1) \qquad \text{[Formula 5]}$$

Note that α is a weight coefficient that determines a ratio of QP_bit and QP_buf.

The value of the weight coefficient α is determined by using the counter value set by the counter unit 710.

Figure 11:
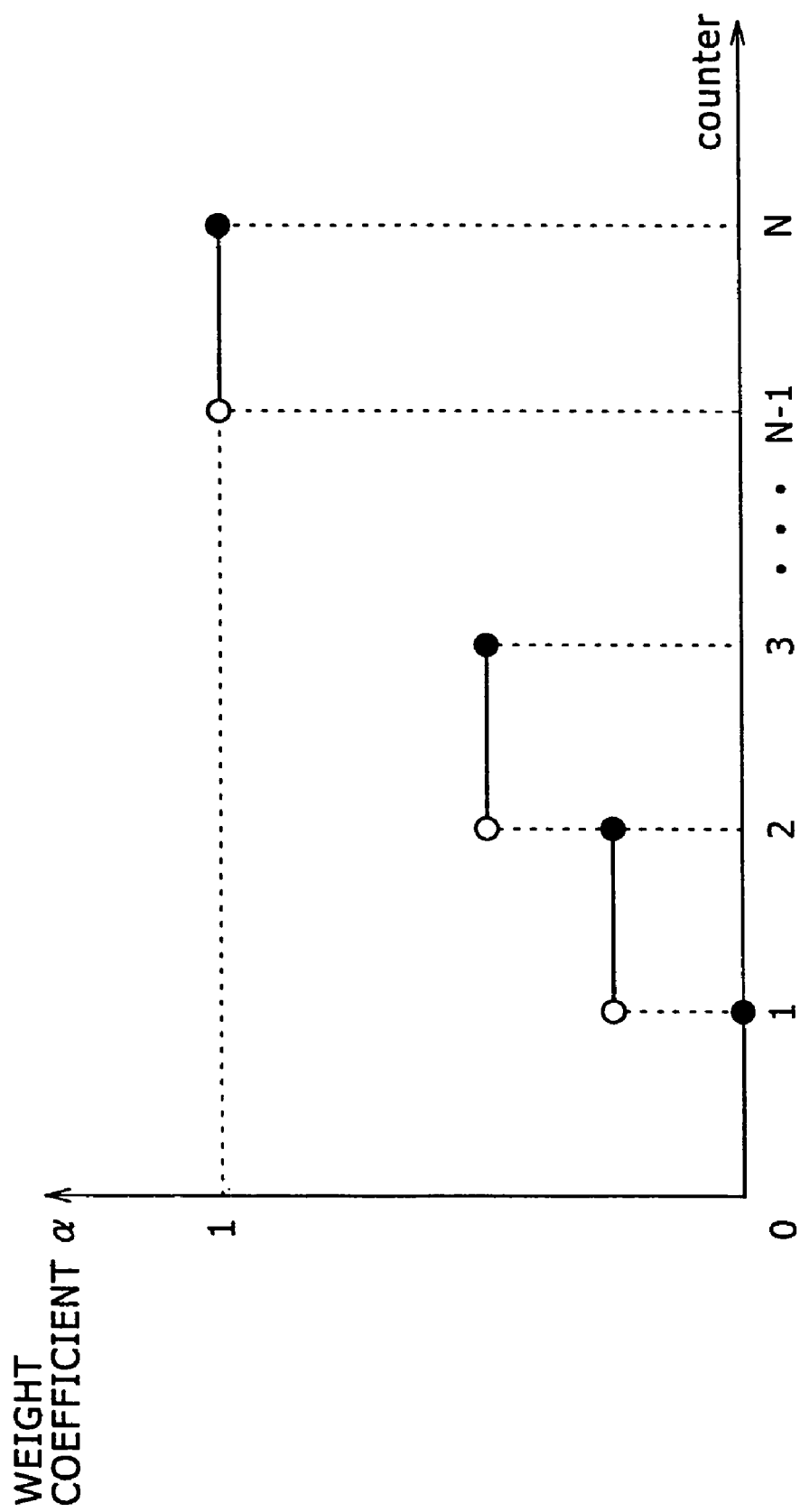
FIG. 11 is a setting example of a weight coefficient α according to the third embodiment of the present invention.

FIG. 11 is a view for explaining a setting example of the weight coefficient α of the quantization parameter determination unit 711.

The quantization parameter determination unit 711 determines the weight coefficient α depending on the counter value set by the counter unit 710. To be more concrete, the quantization parameter determination unit 711 controls so that as the counter value "counter" is smaller, α is made smaller, and as the counter value "counter" is larger, α is made larger.

As described above, in the image coding apparatus according to the third embodiment, as similar to the second embodiment, in the case where the remaining video buffer capacity is close to the intermediate value between the maximum threshold and the minimum threshold, the weighting of the quantization parameter computed on the basis of the generated bit is made larger, thus a convergence time required to reach the target bit can be reduced. On the other hand, in the case where the remaining video buffer capacity becomes closer to the maximum threshold or the minimum threshold, collapse of the video buffer in an encoder or a decoder can be prevented by largely weighting the quantization parameter on the basis of the remaining video buffer capacity.

Particularly, in the third embodiment, the weighting is controlled stepwise per predetermined time unit according to changes in the remaining video buffer capacity. Therefore, variation in the quantization parameter at the time of the switching becomes smoother and rapid variation in the quantization parameter can be suppressed as compared to the second embodiment. Accordingly, rapid variation in the subjective image quality can be suppressed.

Fourth Embodiment

Next, the fourth embodiment according to the present invention will be described.

Figure 12:
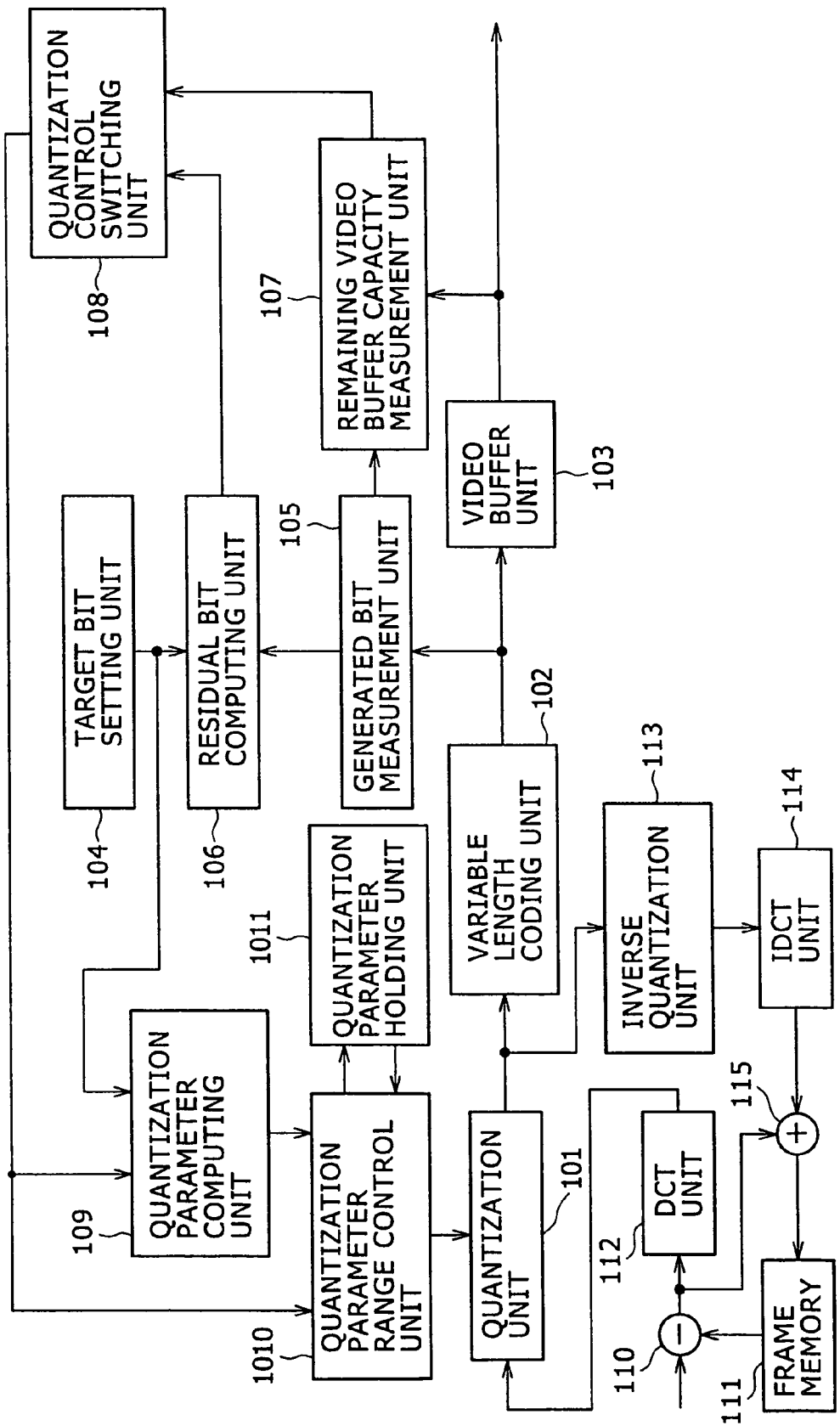
FIG. 12 is a configuration block diagram of an image coding apparatus according to a fourth embodiment of the present invention.

FIG. 12 is a configuration block diagram of an image coding apparatus according to the fourth embodiment of the present invention.

Note that the elements having the same functions as those in the first embodiment will be given the same numerals, and the explanation thereof will be omitted.

The image coding apparatus shown in FIG. 12 includes the quantization unit 101, the variable length coding unit 102, the video buffer unit 103, the target bit setting unit 104, the generated bit measurement unit 105, the residual bit computing unit 106, the remaining video buffer capacity measurement unit 107, the quantization control switching unit 108, the quantization parameter determination unit 109, a quantization parameter range control unit 1010, a quantization parameter holding unit 1011, the subtracter 110, the frame memory 111, the DCT unit 112, the inverse quantization unit 113, the IDCT unit 114, and the adder 115.

Hereinafter, a quantization control of the image coding apparatus according to the fourth embodiment will be described.

The generated bit measurement unit 105 measures a bit per predetermined time unit that is output from the variable length coding unit 102 as in the case with the above-described first embodiment. In addition, the target bit setting unit 104 stores a predetermined target bit per predetermined time unit.

The residual bit computing unit 106 computes a residual value between the generated bit measured by the generated bit measurement unit 105 and the target bit per predetermined time unit set by the target bit setting unit 104.

The remaining video buffer capacity measurement unit 107 measures the remaining video buffer capacity of the video buffer unit 103 per predetermined time unit.

The quantization control switching unit 108 determines which of the residual value computed by the residual bit computing unit 106 and the remaining video buffer capacity measured by the remaining video buffer capacity measurement unit 107 is used for determining a quantization parameter that is set to the next image data to be encoded.

The quantization parameter computing unit 109 determines a quantization parameter that is set to the next image data to be encoded by using one of the remaining video buffer capacity and the residual value on the basis of the result determined by the quantization control switching unit 108.

The quantization parameter range control unit 1010 reads the quantization parameter having been set to the immediately previous image data from the quantization parameter holding unit 1011, and controls so that a quantization parameter computed by the quantization parameter computing unit 109 can fall within a predetermined range with respect to the last quantization parameter. The quantization parameter range control unit 1010 determines the result as the quantization parameter that is set to the next image data to be encoded.

The quantization parameter holding unit 1011 holds the quantization parameter that has been finally determined by the quantization parameter range control unit 1010.

Next, an operation of the quantization parameter range control unit 1010 will be described.

Figure 13:
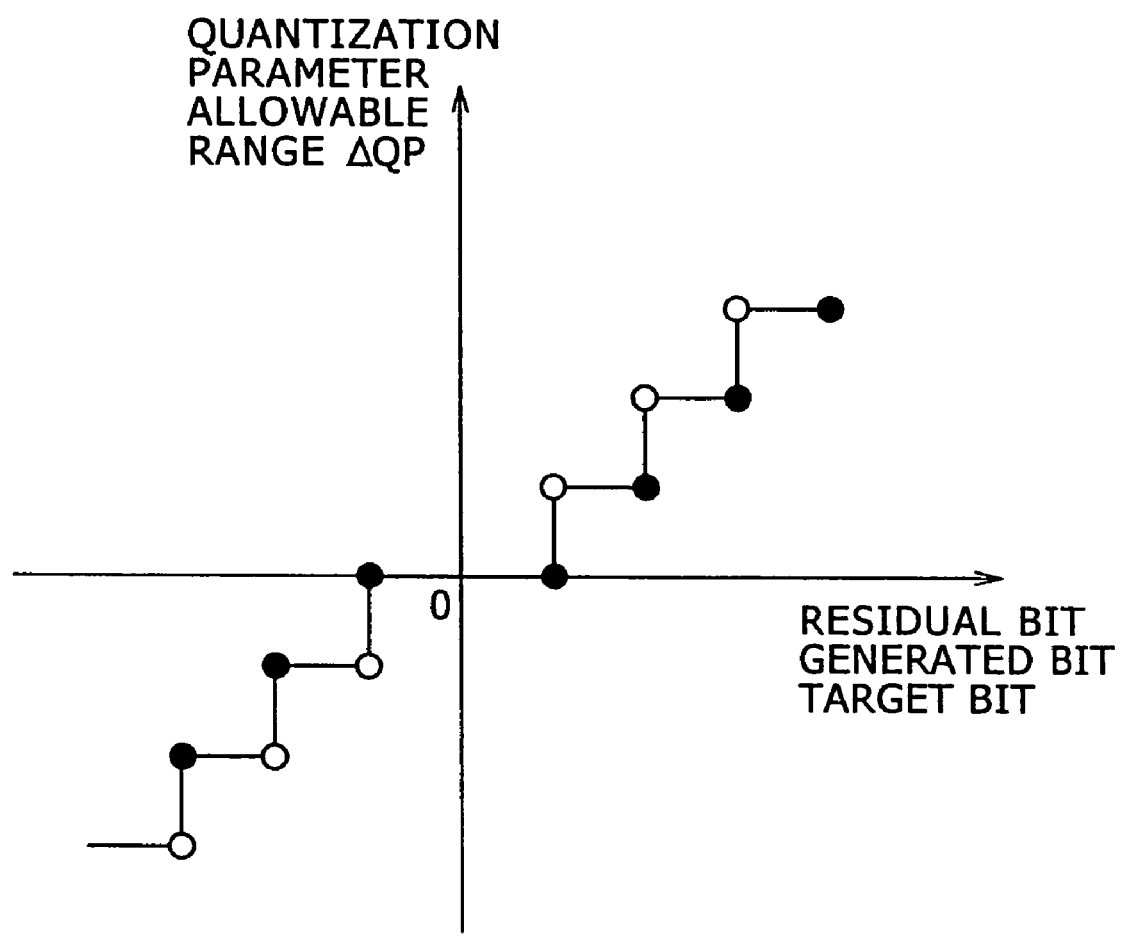
FIG. 13 is a view for explaining a process of a quantization parameter range control unit according to the fourth embodiment of the present invention.
Figure 14:
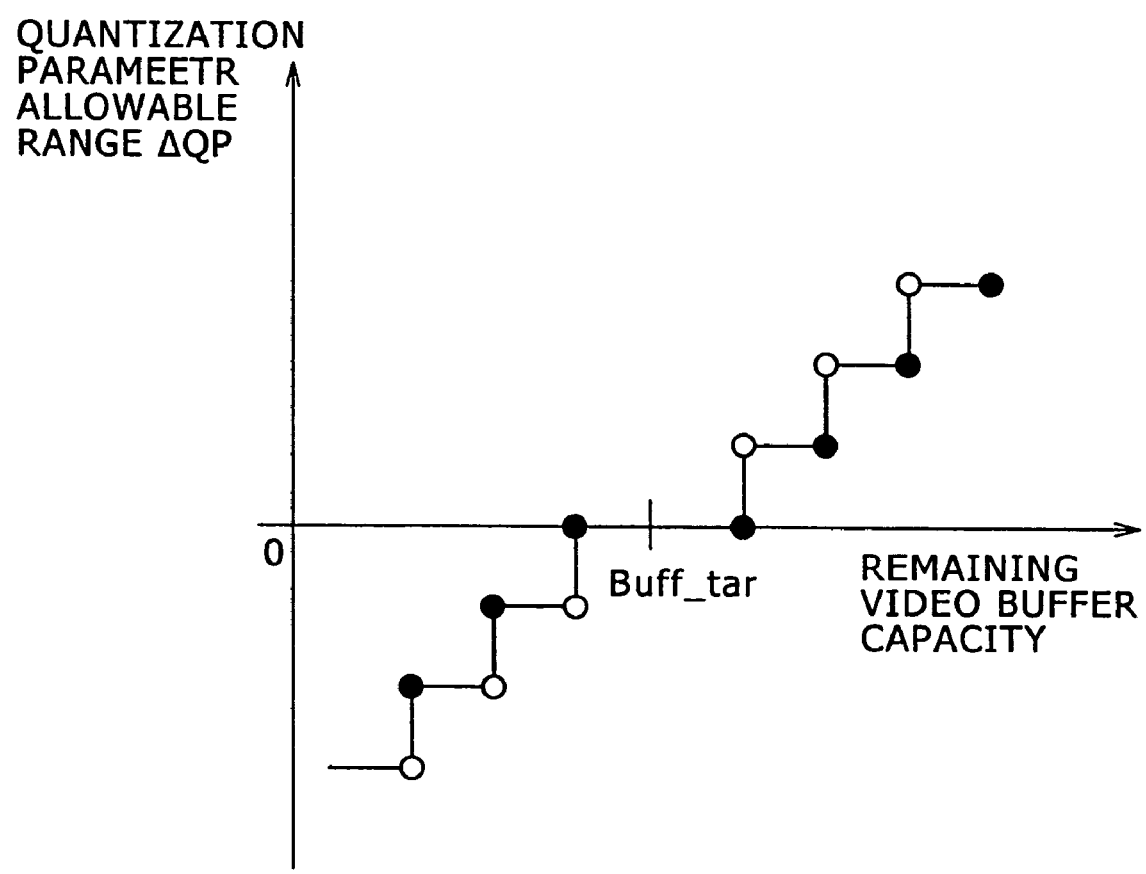
FIG. 14 is a view for explaining a process of the quantization parameter range control unit according to the fourth embodiment of the present invention.
Figure 15:
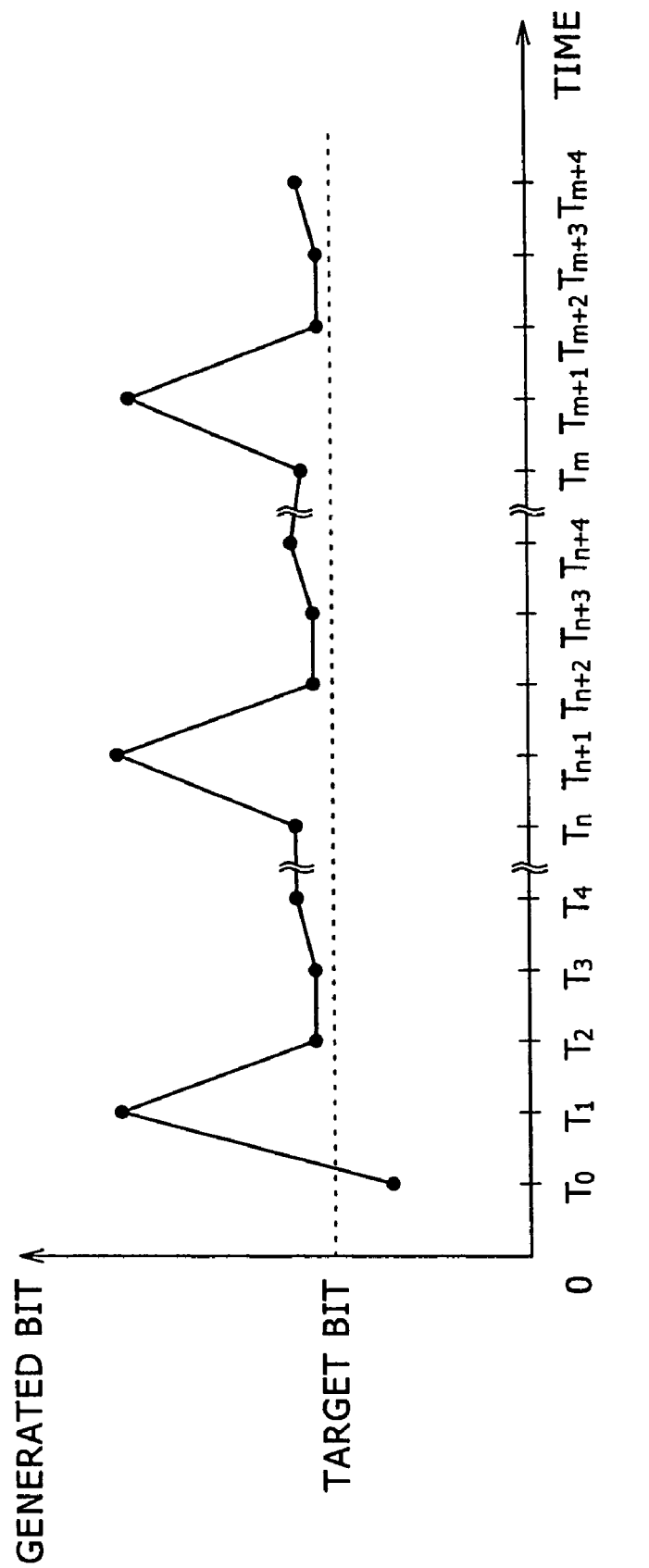
FIG. 15 is a diagram showing the generated bit per unit time by a conventional encoder that executes a quantization control on the basis of the generated bit.

FIGS. 13 and 14 are views for explaining a process of the quantization parameter range control unit 1010.

The quantization parameter range control unit 1010 determines a quantization parameter (QP_final) to be used for encoding the next image data in the following controlling manner. That is, an allowable range is provided to the quantization parameter that has been used for encoding the immediately previous image data, and a quantization parameter is controlled so as not to vary to exceed the allowable range.

FIG. 13 shows the allowable range of the quantization parameter using the residual value (residual bit) computed by the residual bit computing unit 106. The horizontal axis shows the residual bit in FIG. 13. The residual bit is a value obtained by subtracting the target bit from the generated bit.

FIG. 14 shows the allowable range of the quantization parameter using the remaining video buffer capacity measured by the remaining video buffer capacity measurement unit 107. In FIG. 14, Buff_tar is a predetermined target value for the remaining video buffer capacity.

The quantization control switching unit 108 determines whether to execute a quantization control on the basis of the generated bit or to execute a quantization control on the basis of the remaining video buffer capacity, as similar to the above-described first embodiment.

The quantization parameter range control unit 1010 executes a quantization control on the basis of the determination by the quantization control switching unit 108.

Specifically, in the case where a quantization control on the basis of the generated bit is determined by the quantization control switching unit 108, the quantization parameter range control unit 1010 computes a quantization parameter allowable range $\Delta QP$ using FIG. 13 on the basis of the input generated bit.

Alternatively, in the case where a quantization control on the basis of the remaining video buffer capacity is determined by the quantization control switching unit 108, the quantization parameter range control unit 1010 computes the quantization parameter allowable range $\Delta QP$ using FIG. 14 on the basis of the input remaining video buffer capacity.

Next, with the following Formula 6, the quantization parameter range control unit 1010 computes the quantization parameter QP_final to be used for encoding the next image data by using the computed quantization parameter allowable range $\Delta QP$, the quantization parameter QP_prev of the immediately previous image data read from the quantization parameter holding unit 1011 and the quantization parameter QP_cal computed by the quantization parameter computing unit 109.

$$QP\_final = \begin{cases} QP\_prev + \Delta QP & (in\,the\,case\,of\,|QP\_cal - QP\_prev| > |\Delta QP|) \\ QP\_cal & (except\,for\,the\,above\,condition) \end{cases} \quad [\text{Formula 6}]$$

The quantization parameter range control unit 1010 determines the quantization parameter QP_final computed with Formula 6 as the quantization parameter that is set to the next image data to be encoded, and then outputs the same to the quantization unit 101. Further, the quantization parameter QP_final is output to the quantization parameter holding unit 1011.

As described above, the image coding apparatus according to the fourth embodiment includes the quantization control means on the basis of the generated bit and the quantization control means on the basis of the remaining video buffer capacity. Further, in the case where the remaining video buffer capacity is larger than the predetermined minimum threshold and smaller than the predetermined maximum threshold, the image coding apparatus according to the fourth embodiment executes quantization control on the basis of the generated bit, thus reducing a convergence time required to reach the target bit. On the other hand, in the case where the remaining video buffer capacity is smaller than the predetermined minimum threshold or larger than the predetermined maximum threshold, the image coding apparatus according to the fourth embodiment executes quantization control on the basis of the remaining video buffer capacity, thus preventing the video buffer in an encoder or a decoder from collapsing.

In the above-described first embodiment, the quantization parameter computed by the quantization parameter computing unit 109 is directly reflected as the quantization parameter that is set to the next image data to be encoded. On the contrary, in the fourth embodiment, an allowable range is provided stepwise to the quantization parameter that has been set to the immediately previous image data. Thus the provision prevents a quantization parameter that is set to the next image data to be encoded from drastically changing due to minute variation in the generated bit or the remaining video buffer capacity. As a result, deterioration in the image quality due to rapid variation in the subjective image quality can be suppressed.

Note that the immediately previous image data may be the last one frame, or the last one field in the case where the input image is an interlaced signal. Alternatively, the immediately previous image data may be the last one block of plural blocks into which one frame is divided. Moreover, for example, in the case where a coding mode (I picture, P picture and B picture) is changed per frame unit, the immediately previous image data may be the last one frame of respective coding modes.

What is claimed is:

1. A video signal encoding apparatus comprising:
a quantization unit for quantizing video data based on a quantization parameter that has been set, to obtain quantized video data,
an encoder unit for encoding the quantized video data, as encoded video data,
a video buffer unit including a video buffer memory for outputting the encoded video data;
a generated bit measurement unit for measuring a generated bit per predetermined time unit in the encoder unit;
a target bit setting unit for setting a target bit per predetermined time unit;
a residual bit computing unit for computing a residual value between the generated bit measured by the generated bit measurement unit and the target bit set by the target bit setting unit;
a remained video buffer capacity measurement unit for measuring a remaining video buffer capacity of the video buffer unit per predetermined time unit;
a counter unit for setting a counter value that is increased or decreased on a basis of the remaining video buffer capacity, and
a quantization parameter computing unit for computing a revised quantization parameter to set to the quantization unit,
wherein the quantization parameter computing unit includes:
a first quantization parameter computing unit for computing a first quantization parameter by using the residual value computed;
a second quantization parameter computing unit for computing a second quantization parameter by using the remaining video buffer capacity measured; and
a third quantization parameter determination unit for determining a third quantization parameter that is set as the revised quantization parameter to be used for a next video data to be encoded,
wherein the third quantization parameter determination unit computes a weighting between the first quantization parameter and the second quantization parameter on a basis of the counter value that has been set, and then computes the third quantization parameter by using the weighting; and,
wherein at least one of the quantization unit, the encoder unit, the video buffer unit, the generated bit measurement unit, the target bit setting unit, the residual bit computing unit, the remained video buffer capacity measurement unit, the counter unit, the quantization parameter computing unit, the first quantization parameter computing unit, the second quantization parameter computing unit and the third quantization parameter determination unit is effected via a hardware processor.

2. A non-transitory computer-readable medium encoded with a video signal encoding program causing a computer to execute for executing steps of a video signal encoding method of encoding video data based on a quantization parameter that has been set, the video signal encoding method comprising:
a first step of quantizing video data based on a quantization parameter that has been set, to obtain quantized video data,
a second step of encoding the quantized video data, as encoded data,
a third step of measuring a generated bit per predetermined time unit of the encoded video data, to obtain a measured bit,
a fourth step of setting a target bit per predetermined time unit, as a set target bit;
a fifth step of computing a residual value between the measured bit measured in the third step and the set target bit in the fourth step,
a sixth step of measuring, per predetermined time unit, a remaining video buffer capacity, of a video buffer unit including a video buffer memory for outputting the encoded data;
a seventh step of computing a first quantization parameter by using the residual value computed by the fifth step;
an eighth step of computing a second quantization parameter by using the remaining video buffer capacity measured by the sixth step;
a ninth step of setting a counter value that is increased or decreased on a basis of the remaining video buffer capacity measured by the sixth step,
a tenth step of computing a weighting between the first quantization parameter and the second quantization parameter on a basis of the counter value that has been set by the ninth step, and then computing, by using the weighting, a third quantization parameter that is used for next video data to be encoded.

* * * * *